(12) United States Patent
Fuji

(10) Patent No.: US 7,999,876 B2
(45) Date of Patent: Aug. 16, 2011

(54) PULL-DOWN DETECTION APPARATUS AND PULL-DOWN DETECTION METHOD

(75) Inventor: Kazuhiro Fuji, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 1523 days.

(21) Appl. No.: 11/350,892

(22) Filed: Feb. 10, 2006

(65) Prior Publication Data

US 2006/0187341 A1     Aug. 24, 2006

(30) Foreign Application Priority Data

Feb. 22, 2005   (JP) .................................. 2005-045481
Aug. 16, 2005   (JP) .................................. 2005-235729

(51) Int. Cl.
*H04N 11/04* (2006.01)
*H04N 5/14* (2006.01)

(52) U.S. Cl. ...................................... 348/441; 348/700

(58) Field of Classification Search .................. 348/441, 348/458

See application file for complete search history.

(56) References Cited

U.S. PATENT DOCUMENTS

| 6,236,806 | B1 | 5/2001 | Kojima et al. | |
| 7,106,379 | B2 | 9/2006 | Terai | |
| 7,307,670 | B2 | 12/2007 | Lu | |
| 7,728,908 | B2 * | 6/2010 | Tokutomi | 348/441 |
| 2006/0012707 | A1 * | 1/2006 | Chow | 348/441 |
| 2006/0187301 | A1 * | 8/2006 | Fuji | 348/97 |

FOREIGN PATENT DOCUMENTS

| CN | 1500347 A | | 5/2004 |
| JP | 10-145779 | * | 5/1998 |
| JP | 2001-197363 | | 7/2001 |
| JP | 2003-153077 | | 5/2003 |
| JP | 2004-034333 | | 2/2004 |
| JP | 2004-242196 | * | 8/2004 |
| JP | 2005-045470 | | 2/2005 |
| KR | 10-2004-0019282 | | 3/2004 |
| TW | 1225365 | | 12/2004 |
| WO | WO 03/039148 | | 5/2003 |
| WO | WO 03/084227 A1 | | 10/2003 |
| WO | WO 03/088641 | | 10/2003 |
| WO | WO 03/088641 A2 | | 10/2003 |

OTHER PUBLICATIONS

Taiwanese Office Action dated Oct. 26, 2009 with English-language translation.

(Continued)

*Primary Examiner* — Hung H Lam
(74) *Attorney, Agent, or Firm* — McGinn Intellectual Property Law Group, PLLC

(57) ABSTRACT

A pull-down detection apparatus includes a pixel comparator at least performing pixel comparison between a subsequent field and a present field and horizontal pixel comparison in the subsequent field and the present field to determine a presence of a pixel change between the subsequent field and the present field, a field comparator determining a presence of an image change between the subsequent field and the present field based on a determination result in the pixel comparator, and a pull-down determinater determining that the input video signal is generated by pull-down processing based on a history of a determination result in the field comparator.

9 Claims, 20 Drawing Sheets

OTHER PUBLICATIONS

U.S. Appl. No. 11/350,890, filed Feb. 10, 2006.
U.S. Appl. No. 11/349,904, filed Feb. 9, 2006.
Chinese Office Action dated Sep. 12, 2008 with English-Language Translation.
Japanese Office Action dated Jan. 4, 2011, with English translation.
Japanes Office Action dated Dec. 14, 2010, with partial English translation.

* cited by examiner

PULL-DOWN DETECTION APPARATUS AND PULL-DOWN DETECTION METHOD

BACKGROUND OF THE INVENTION

1. Field of the Invention

The present invention relates a pull-down detection apparatus and a pull-down detection method for detecting that an interlace video signal is generated by pull-down processing.

2. Description of Related Art

When converting commercial films recorded at 24 frames/second into an NTSC video signal at 60 fields/second, 2-3 pull-down processing that creates 5 fields from 2 frames of an original image is performed. When converting commercial films recorded at 24 frames/second into a PAL video signal at 50 fields/second and when converting commercial films recorded at 30 frames/second into an NTSC video signal at 60 fields/second, 2-2 pull-down processing that creates 2 fields from 1 frame of an original image is performed.

On the other hand, when displaying interlace video signals such as the NTSC signal at 60 fields/second and the PAL signal at 50 fields/second, interlace/progressive conversion (hereinafter referred to as the IP conversion) that converts the interlace video signal into a progressive video signal is required. The IP conversion generates a missing line of the interlace video signal to produce a progressive signal.

In the IP conversion, a method for creating pixel data of a missing line involves intra-field interpolation and inter-field interpolation. The intra-field interpolation interpolates the pixel data of a missing line from the pixel data of two lines adjacent to the missing line. The inter-field interpolation interpolates the pixel data of a missing line from the pixel data of the lines of two successive fields.

However, performing the IP conversion by the intra-field interpolation on the interlace signal generated by pull-down processing such as the 2-2 pull-down processing, which is referred to hereinafter as the pull-down signal, causes an obtained frame signal to have a lower vertical resolution than an original image before the pull-down conversion. Further, in the case of the inter-field interpolation, generating a frame signal using two fields created from different frames causes deterioration in image quality due to comb noise or the like.

In order to avoid the image quality deterioration, when performing the IP conversion on the interlace signal generated by the pull-down processing, it is preferred to create a frame signal by combining two field signals that are generated from the same frame. This allows preventing the image quality deterioration. Performing the IP conversion by using the regularity of the pull-down signal is called reverse pull-down processing.

FIG. 19 shows an example of the reverse 2-2 pull-down processing. FIG. 19 illustrates the 2-2 pull-down processing for obtaining a field signal at 60I (60 fields/second) from a frame signal at 30P (30 frames/second) and the reverse 2-2 pull-down processing for obtaining a field signal at 60P (60 frames/second) from a frame signal at 60I (60 fields/second). For example, the 2-2 pull-down processing creates a field image 1T including odd lines of the frame 1 and a field image 1B including even lines of the frame 1 from a frame 1 at 30 P. On the other hand, the reverse 2-2 pull-down processing interpolates a missing line from the field images 1T and 1B that are created from the same frame to create two frames of a frame 1-1 and a frame 1-2. This is the same as in a frame 2 and subsequent frames.

Japanese Unexamined Patent Application Publication No. 2004-242196 describes the 2-2 pull-down detection apparatus that detects that an interlace video signal is a 2-2 pull-down signal and a progressive conversion apparatus that performs IP conversion by using 2 fields created from the same frame upon detection of the 2-2 pull-down signal. FIG. 18A shows an example of the 2-2 pull-down detection apparatus disclosed therein.

The 2-2 pull-down detection apparatus 90 of FIG. 18A includes a pixel difference comparator 91, a mismatched pixel number comparator 92 and a pull-down regularity detector 93.

The pixel difference comparator 91 calculates a difference between a pixel value of a pixel b1 of a present field signal b and a pixel value of a pixel a1 of a field signal a that is an immediately following field of the present field signal b and compares the difference with a threshold value as shown in FIG. 18B. The pixels a1 and b1 are located in the positions that are perceived as substantially the same on a screen. Specifically, the pixels a1 and b1 are at the same horizontal positions and the line containing the pixel b1 is placed adjacently under the line containing the pixel a1.

If the comparison result shows that the difference in pixel value between the pixel b1 and the pixel a1 is beyond a predetermined threshold value R1, a signal set to "1" indicating a change in pixel is supplied to the mismatched pixel number comparator 92. If, on the other hand, the difference is below the threshold value R1, a signal set to "0" indicating no change in pixel is supplied to the mismatched pixel number comparator 92.

The mismatched pixel number comparator 92 receives a signal supplied from the pixel difference comparator 91, counts the number of detections of a change in pixel value by the pixel difference comparator 91 for one field period and then compares the counted number at the end of the one field with the predetermined threshold value R2. If the counted value exceeds the threshold value R2, the mismatched pixel number comparator 92 supplies a signal set to "1" indicating that the field signal a and b are generated from different frames to the pull-down regularity detector 93. If, on the other hand, the counted value falls blow the threshold value R2, it supplies a signal set to "0" indicating that the field signal a and b are generated from the same frame to the pull-down regularity detector 93.

If the output signal from the mismatched pixel number comparator 92 has a pattern that 1 and 0 are repeated alternately like "1010..." or "0101...", the pull-down regularity detector 93 determines that there is a regularity of 2-2 pull-down signal. If, on the other hand, that repeated pattern of the output signal from the mismatched pixel number comparator 92 is lost, the pull-down regularity detector 93 determines that no regularity of 2-2 pull-down signal exists.

As described above, the pull-down detection apparatus determines if an image changes between adjacent fields and observes the regularity of the determination results, thereby detecting if it is a pull-down signal. Thus, for the accurate detection of the pull-down signal, it is necessary for the 2-2 pull-down detection apparatus 90 shown in FIG. 18A, for example, to perform accurate determination of a change in unit of pixels by the pixel difference comparator 91 and accurate determination of a change in units of fields by the mismatched pixel number comparator 92.

The conventional pull-down detection apparatus such as the 2-2 pull-down detection apparatus 90 shown in FIG. 18A detects a change in image based on the result of pixel comparison in time and vertical directions with use of the pixel of the present field b and the pixel of the subsequent field a. However, the conventional comparison is subject to wrong determination of an image without change as an image with change particularly when a display image contains a high-frequency portion (hereinafter referred to as the edge portion) such as an oblique line and an object boundary, for example.

For example, when a change in pixel value is large in the horizontal direction, it means that a display image contains a high-frequency portion (edge portion) such as an oblique line and an object boundary. The edge portion is likely to have an edge portion with a high vertical frequency in the vertical direction as well. In this case, the conventional pull-down detection apparatus is likely to wrongly determines that a change occurs in the image in spite that there is no change in image between the pixel field and the subsequent field due to a difference in pixel value caused by the edge portion.

Further, in a pixel where a change in pixel value is excessively large between the subsequent field a and the present field b, which is, where a temporal change is large, even if the conventional pull-down detection apparatus detects a change in pixel value, it is unable to determine if it is due to a change in image between fields or due to the edge portion of a high-frequency image. If such a pixel is added to the determination of an image change, the wrong determination of image change is likely to occur even when the subsequent field a and the present field b are created from the same frame.

As described in the foregoing, the present invention has recognized that the conventional pull-down detection apparatus is likely to wrongly determine an image without image change to be an image with image change, thus having lower detecting accuracy of a pull-down signal.

SUMMARY OF THE INVENTION

According to an aspect of the present invention, there is provided a pull-down detection apparatus for detecting that an input video signal is generated by pull-down processing, which includes a pixel comparator at least performing pixel comparison between a first field contained in the input video signal and a second field that is one-field before the first field and horizontal pixel comparison in the first field and/or the second field to determine a presence of a pixel change between the first field and the second field; a field comparator compiling a determination result in the pixel comparator and determining a presence of an image change between the first field and the second field based on the determination result in the pixel comparator; and a pull-down determinater determining that the input video signal is generated by pull-down processing based on a history of a determination result in the field comparator.

This configuration allows adding the horizontal pixel comparison result to the condition for determination on pixel change. It is thereby possible to exclude a pixel whose pixel value changes largely in the horizontal direction from the pixels to be detected, thereby preventing wrong determination due to the presence of an edge portion and improving the determination accuracy of image change.

According to another aspect of the present invention, there is provided a pull-down detection apparatus for detecting that an input video signal is generated by pull-down processing, which includes a pixel comparator at least performing pixel comparison between a first field contained in the input video signal and a second field that is one-field before the first field and pixel comparison between the first field and a third field that is two-field before the first field to determine a presence of an pixel change between the first field and the second field; a field comparator compiling a determination result in the pixel comparator and determining a presence of an image change between the first field and the second field based on the determination result in the pixel comparator; and a pull-down determinater determining that the input video signal is generated by pull-down processing based on a history of a determination result in the field comparator.

This configuration allows adding the temporal pixel comparison result to the condition for determination on pixel change. It is thereby possible to exclude a pixel whose pixel value changes largely in the temporal direction from the pixels to be detected, thereby preventing wrong determination on the image that changes largely in the temporal direction and improving the determination accuracy of image change.

According to an aspect of the present invention, there is provided a pull-down detection method for detecting that a video signal is generated by pull-down processing, which includes measuring a difference in pixel between a first field contained in the video signal and a second field that is one-field before the first field and comparing the difference with a first threshold value; measuring a difference in pixel horizontally in the first field and/or the second field and comparing the difference with a second threshold value; determining a presence of a pixel change between the first field and the second field based on a comparison result with the first threshold value and the second threshold value; determining a presence of an image change between the first field and the second field based on a determination result of a presence of a pixel change; and determining that the video signal is generated by pull-down processing based on a history of a determination result of a presence of an image change.

This method allows adding the horizontal pixel comparison result to the condition for determination on pixel change. It is thereby possible to exclude a pixel whose pixel value changes largely in the horizontal direction from the pixels to be detected, thereby preventing wrong determination due to the presence of an edge portion and improving the determination accuracy of image change.

According to another aspect of the present invention, there is provided a pull-down detection method for detecting that a video signal is generated by pull-down processing, which includes measuring a difference in pixel between a first field contained in the video signal and a second field that is one-field before the first field and comparing the difference with a first threshold value; measuring a difference in pixel between the first field and a third field that is two-field before the first field and comparing the difference with a second threshold value; determining a presence of a pixel change between the first field and the second field based on a comparison result between the first threshold value and the second threshold value; compiling a determination result of a presence of a pixel change for one field and determining a presence of an image change between the first field and the second field based on a compiling result; and determining that the video signal is generated by pull-down processing based on a history of a determination result of a presence of an image change.

This method allows adding the temporal pixel comparison result to the condition for determination on pixel change. It is thereby possible to exclude a pixel whose pixel value changes largely in the temporal direction from the pixels to be detected, thereby preventing wrong determination on the image that changes largely in the temporal direction and improving the determination accuracy of image change.

The present invention allows providing a pull-down detection apparatus and a pull-down detection method with an improved accuracy of detecting a pull-down signal.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

A specific embodiment of the present invention is described hereinafter in detail with reference to the drawings. The following embodiment applies the present invention to a 2-2 pull-down detection apparatus for detecting a 2-2 pull-down signal and a progressive conversion apparatus for detecting the 2-2 pull-down signal and implements IP conversion.

First Embodiment

Figure 1:
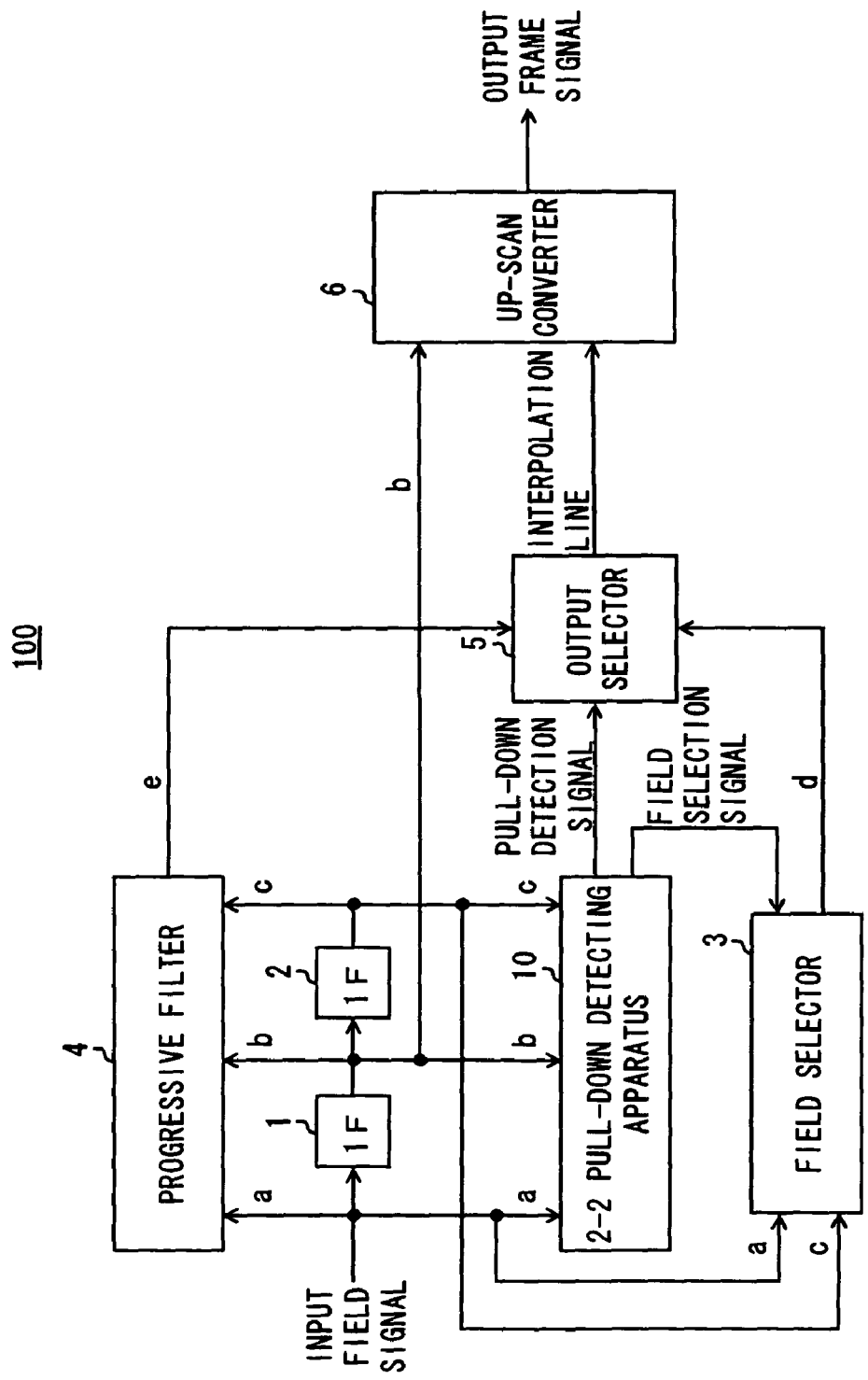
FIG. 1 is a block diagram of a progressive conversion apparatus according to an embodiment of the invention.

FIG. 1 shows the configuration of a progressive conversion apparatus 100 that includes a 2-2 pull-down detection apparatus 10 according to a first embodiment of the invention. In the progressive conversion apparatus 100, the elements different from the 2-2 pull-down detection apparatus 10 are the same as those in the conventional progressive conversion apparatus. The configuration of the progressive conversion apparatus 100 is described below.

Field delay circuits 1 and 2 are memories for delaying a field signal at 60 fields/second by one field period. As a result that the field delay circuits 1 and 2 delay the input field signal to the progressing conversion apparatus 100, a field signal a, an output signal b of the field delay circuit 1 and an output signal c of the field delay circuit 2 become three successive field signals. In the following description, the output signal b of the field delay circuit 1 is referred to as the present field signal, the field signal a that is one field after the present field signal b is referred to as a subsequent field signal, and the field signal c that is one field before the present field signal b is referred to as a previous field signal.

The 2-2 pull-down detection apparatus 10 determines if an input signal is a pull-down signal or not by comparing pixel values of pixels contained in the present field signal b, the subsequent field signal a, and the previous field signal c. If an input signal is a pull-down signal, the 2-2 pull-down detection apparatus 10 supplies a field selection signal to a field selector 3 so as to indicate a field used for interpolation of a missing line. The field selection signal is a signal for indicating the field that is created from the same frame as the present field signal b by the 2-2 pull-down processing is either the subsequent field signal a or the previous field signal c.

The 2-2 pull-down detection apparatus 10 further supplies a pull-down detection signal to an output selector 5 so as to change the way of interpolating a missing line depending on whether an input field signal is a 2-2 pull-down signal or not. The configuration of the 2-2 pull-down detection apparatus 10 and the determination operation in the 2-2 pull-down detection apparatus 10 are detailed later.

The field selector 3 supplies the subsequent field signal a or the previous field signal c as an interpolation signal d according to the field selection signal output from the 2-2 pull-down detection apparatus 10.

A progressive filter 4 receives the present field signal b, the subsequent field signal a and the previous field signal c to detect a change in image. If a change in image is detected, it creates an interpolation line from the pixel of the present field signal b by the intra-field interpolation. On the other hand, if a change in image is not detected, it creates an interpolation line from the pixel of the present field signal b and the pixel of the subsequent field signal a by the inter-field interpolation. The progressive filter 4 supplies the created interpolation line as an interpolation signal e to the output selector 5.

The output selector 5 receives a pull-down detection signal output from the 2-2 pull-down detection apparatus 10. In the pull-down detection, the output selector 5 selects the interpolation signal d supplied from the field selector 3 and supplies it as an interpolation line signal to an up-scan converter 6. On the other hand, in no pull-down detection, the output selector 5 selects an interpolation signal e supplied from the progressive filter 4 and supplies it to the up-scan converter 6.

The up-scan converter 6 performs double-speed conversion of the present field signal b and the interpolation line signal output from the output selector 5 and combines the present field signal b and the interpolation line signal after the double-speed conversion to output a frame signal at 60 frames/second.

The configuration and operation of the 2-2 pull-down detection apparatus 10 of this embodiment are described hereinafter with reference to FIGS. 2 to 9.

Figure 2:
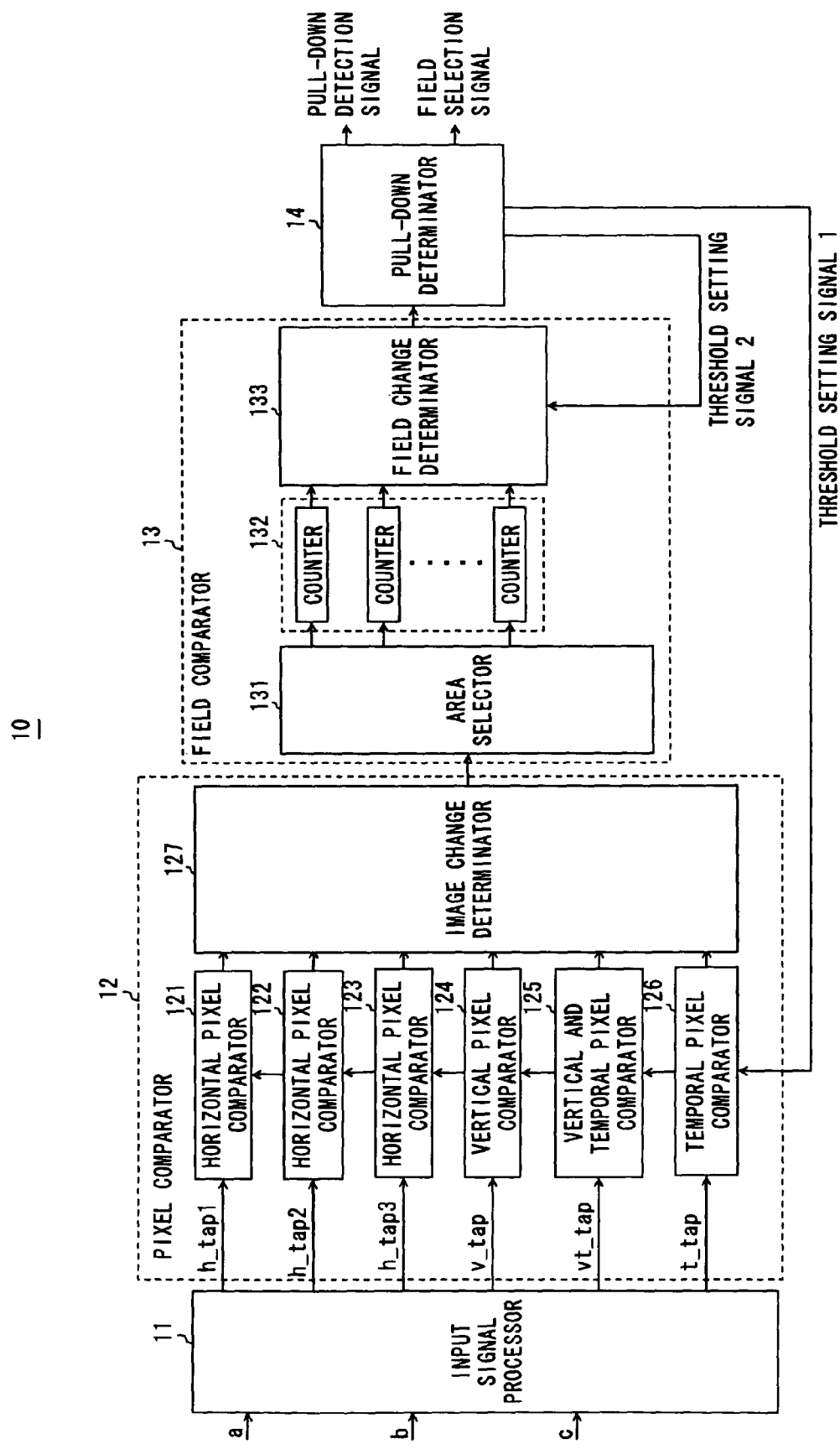
FIG. 2 is a block diagram of a 2-2 pull-down detection apparatus according to an embodiment of the invention.

FIG. 2 shows the configuration of the 2-2 pull-down detection apparatus 10. The 2-2 pull-down detection apparatus 10 includes an input signal processor 11, a pixel comparator 12, a field comparator 13 and a pull-down determinater 14. The entire operation of the 2-2 pull-down detection apparatus 10 is described herein with reference to the flowchart of FIG. 4.

Firstly, in Step S111, the input signal processor 11 receives the three successive field signals a, b and c and outputs signals to be used for the pixel comparator 12 to detect a change in pixel value: h_tap1, h_tap2, h_tap3, v_tap, vt_tap and t_tap.

Then, in Step S112, the pixel comparator 12 determines whether images are similar between the present field b and the subsequent field a for each pixel by using the signals output from the input signal processor 11.

In Step S113, the field comparator 13 compiles the determination results in the pixel comparator 12 in units of fields.

Then, the process repeats Steps S112 and S113 for the pixels of one field and, when the processing of one field ends, the field comparator 13 determines whether images are similar between the present field b and the subsequent field a based on the compiling results of one field (Steps S114 and S115).

In Step S116, the pull-down determiner 14 receives the determination results from the field comparator 13 and detects whether the determination results indicate the regularity of a pull-down signal. If the pull-down determiner 14 detects the regularity of a pull-down signal, it supplies a pull-down detection signal to the output selector 5 and also supplies a field selection signal to the field selector 3 (Steps S117 and S118). On the other hand, if the pull-down determiner 14 does not detect the regularity of a pull-down signal or if the regularity of a pull-down signal is broken, it releases the output of the pull-down detection signal to the output selector 5 (Step S119).

In Step S120, the pull-down determiner 14 determines whether to change a threshold value of the pixel comparator 12 and the field comparator 13 based on the history of the determination results in the field comparator 13. When the condition for threshold change is satisfied, the pull-down determiner 14 changes the threshold values of the pixel comparator 12 and the field comparator 13 or the threshold value of either one of them.

The components of the 2-2 pull-down detection apparatus 10 shown in FIG. 2 is described in detail below.

[Input Signal Processor 11]

The input signal processor 11 receives the three successive field signals a, b and c and outputs signals used for detecting a change in pixel value in the pixel comparator 12. Specifically, it supplies h_tap1, h_tap2 and h_tap3 that are used for detection of a change in pixel value in the horizontal direction, v_tap that is used for detection of a change in pixel value in the vertical direction, vt_tap that is used for detection of a change in pixel value in the vertical time direction, and t_tap that is used for detection of a change in pixel value in the time direction to the pixel comparator 12.

Figure 3A:
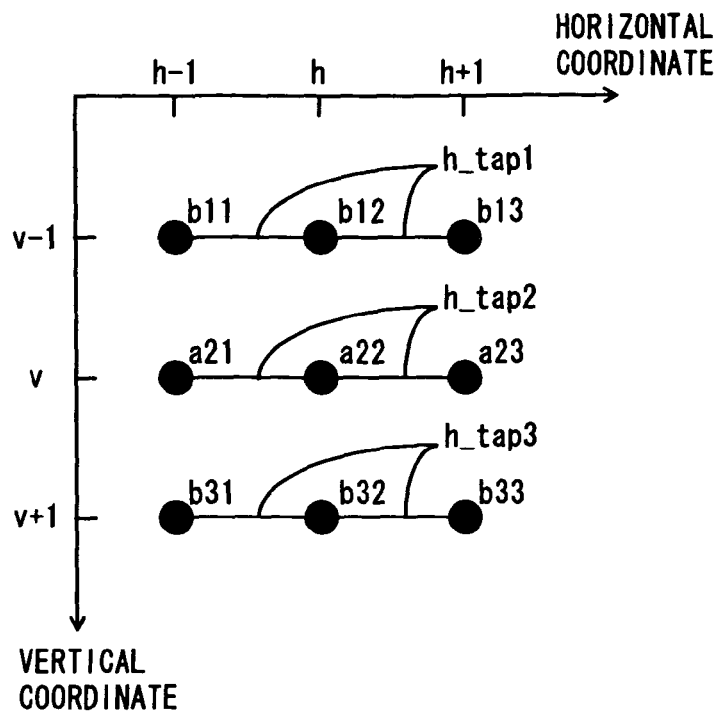
FIGS. 3A and 3B are views to describe a reference pixel in pull-down detection.
Figure 3B:
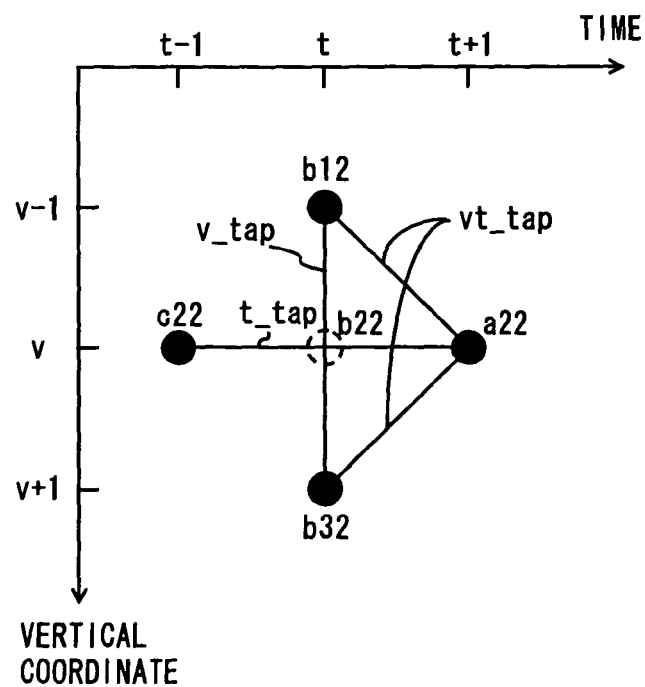
Figure 4:
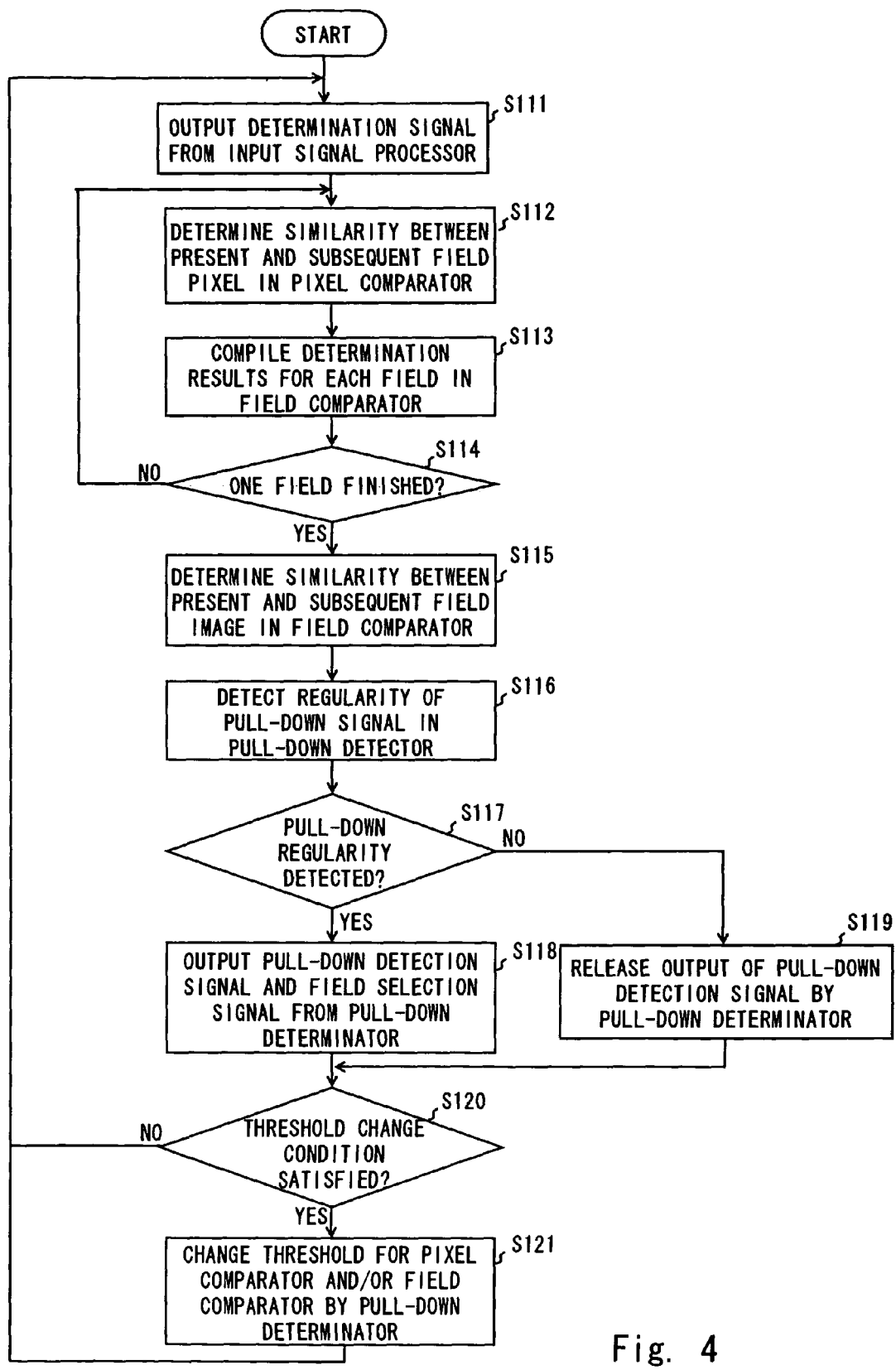
FIG. 4 is the operation flowchart of the 2-2 pull-down detection apparatus according to an embodiment of the invention.

The definitions of h_tap, v_tap, vt_tap and t_tap are described herein with reference to FIGS. 3A and 3B. h_tap contains pixel values of three pixels adjacent in the horizontal direction, which is three successive pixels in the same line. As shown in FIG. 3A, if the line for interpolation is v, h_tap1 contains pixel values of the three pixels b11, b12 and b13 included in the line v−1 that is immediately before the interpolation line v in the present field signal b. h_tap3 contains pixel values of the three pixels b31, b32 and b33 included in the line v+1 that is immediately after the interpolation line v in the present field signal b. h_tap2 contains pixel values of the three pixels a21, a22 and a23 included in the interpolation line v in the subsequence field signal a.

vt_tap contains the pixel values of the pixels located adjacently over and under a pixel to be interpolated of the present field signal b and the pixel value of the pixel of the subsequent field signal a at the same coordinate as the pixel to be interpolated. For example, if the pixel to be interpolated is b22 shown in FIG. 3B, vt_tap contains the pixel values of b12, b32 and a22.

t_tap contains the pixel values of the pixels of the subsequent field signal a and the previous frame signal c that are located at the same coordinate as the pixel to be interpolated of the present field signal b. For example, if the pixel to be interpolated is b22 shown in FIG. 3B, t_tap contains the pixel values of a22 and c22.

Figure 5:
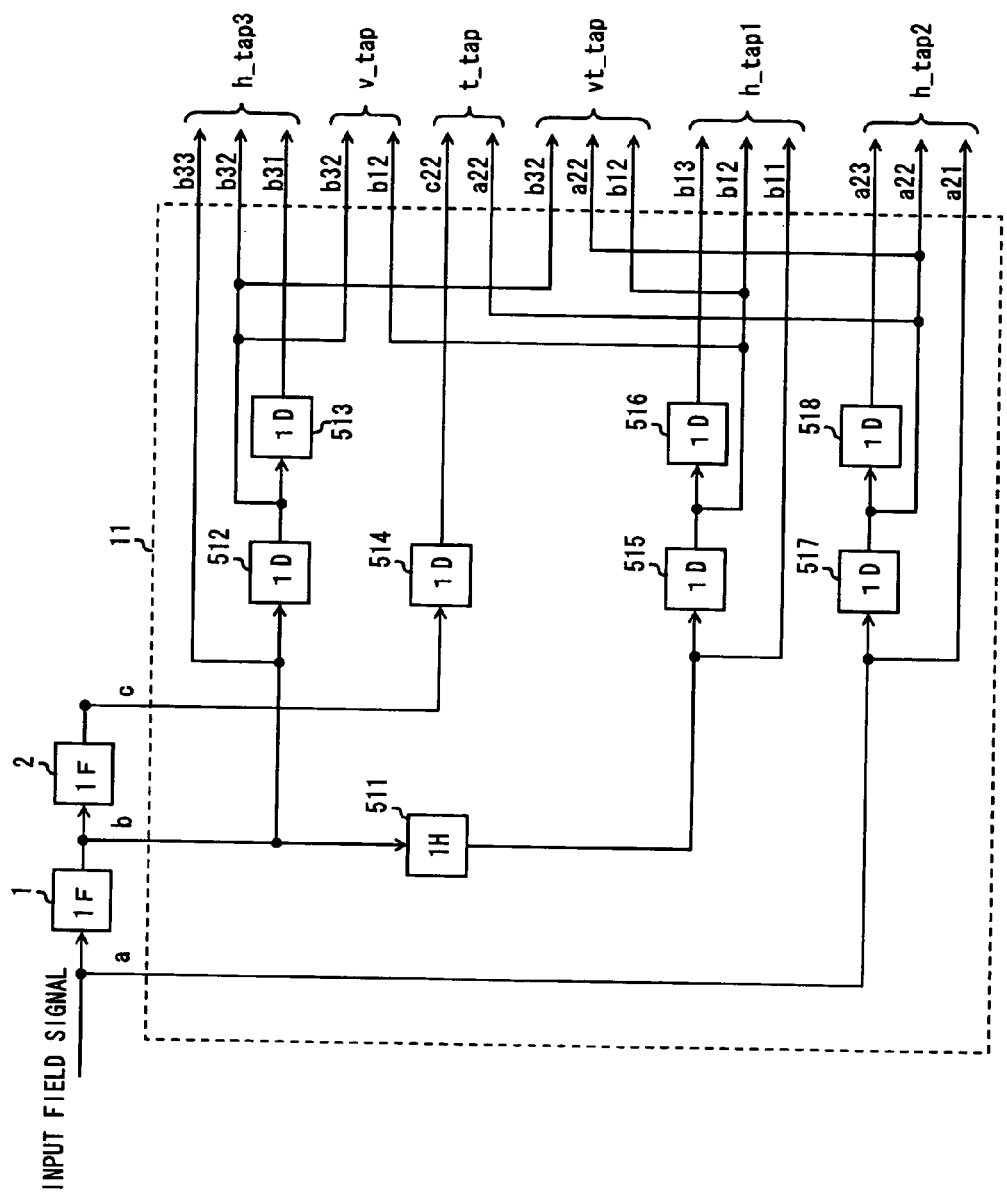
FIG. 5 is a block diagram showing the configuration example of an input signal processor.

FIG. 5 shows the configuration example of the input signal processor 11. A line delay circuit 511 is a memory that delays an input signal by one line (horizontal scan period). Dot delay circuits 512 to 518 are memories that delay an input signal by one dot period. A combination of the line delay circuit 511 and the dot delay circuits 512 to 518 produces h_tap1, h_tap2, h_tap3, v_tap, vt_tap and t_tap.

[Pixel Comparator 12]

The pixel comparator 12 determines if images are similar between the present field b and the subsequent field a in units of pixels by using h_tap1, h_tap2, h_tap3, v_tap, vt_tap and t_tap.

Horizontal pixel comparator 121 to 123 detect the presence of a change in images in the horizontal direction by using h_tap1, h_tap2 and h_tap3. A vertical pixel comparator 124 detects a change in images in the vertical direction by using v_tap. A vertical and temporal pixel comparator 125 detects a change in images between the present field b and the subsequent field a by using vt_tap. A temporal pixel comparator 126 detects a change in images between the previous field c and the subsequent field a by using t_tap.

An image change detector 127 determines if images are similar between the present field b and the subsequent field a, when focusing on a pixel a21 of the subsequent field a, based on the detection results in the horizontal pixel comparator 121 to 123, the vertical pixel comparator 124, the vertical and temporal pixel comparator 125 and the temporal pixel comparator 126.

Figure 18A:
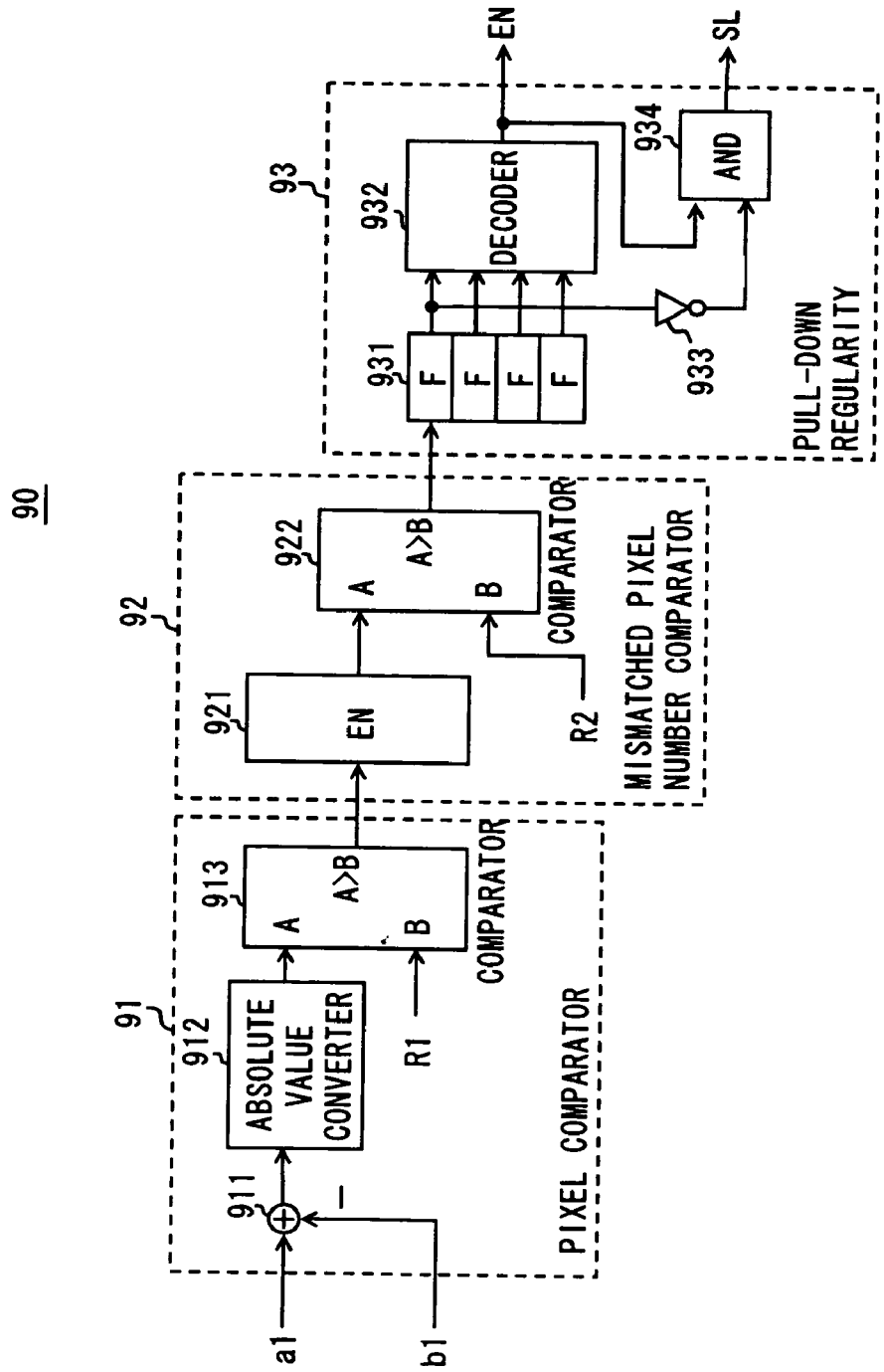
FIG. 18A is a block diagram of a conventional 2-2 pull-down detection apparatus.
Figure 18B:
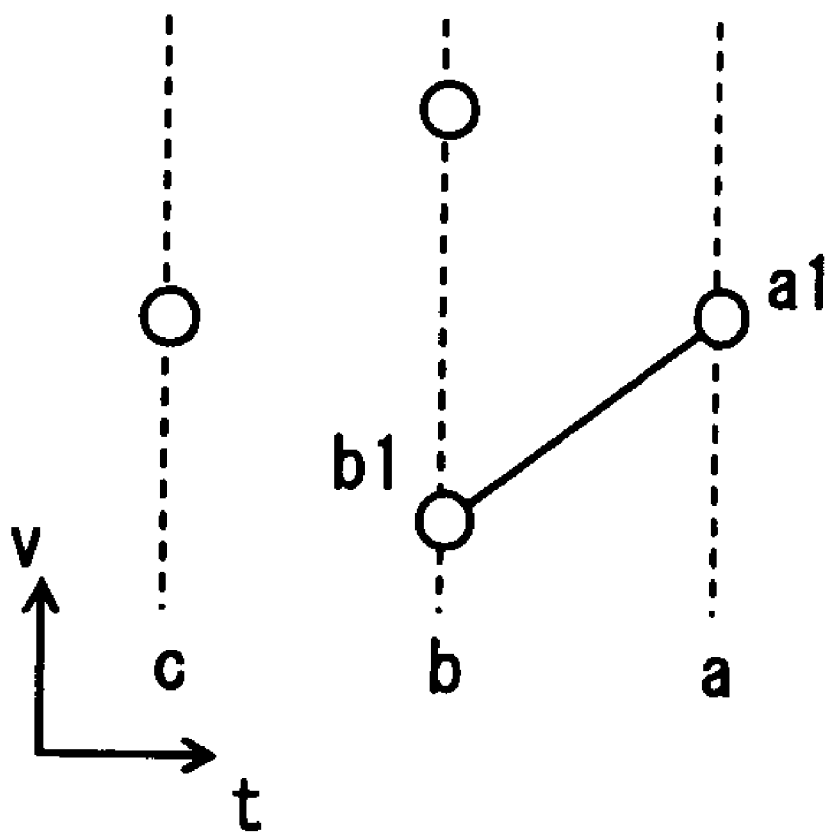
FIG. 18B is a view to describe a reference pixel in conventional pull-down detection.
Figure 19:
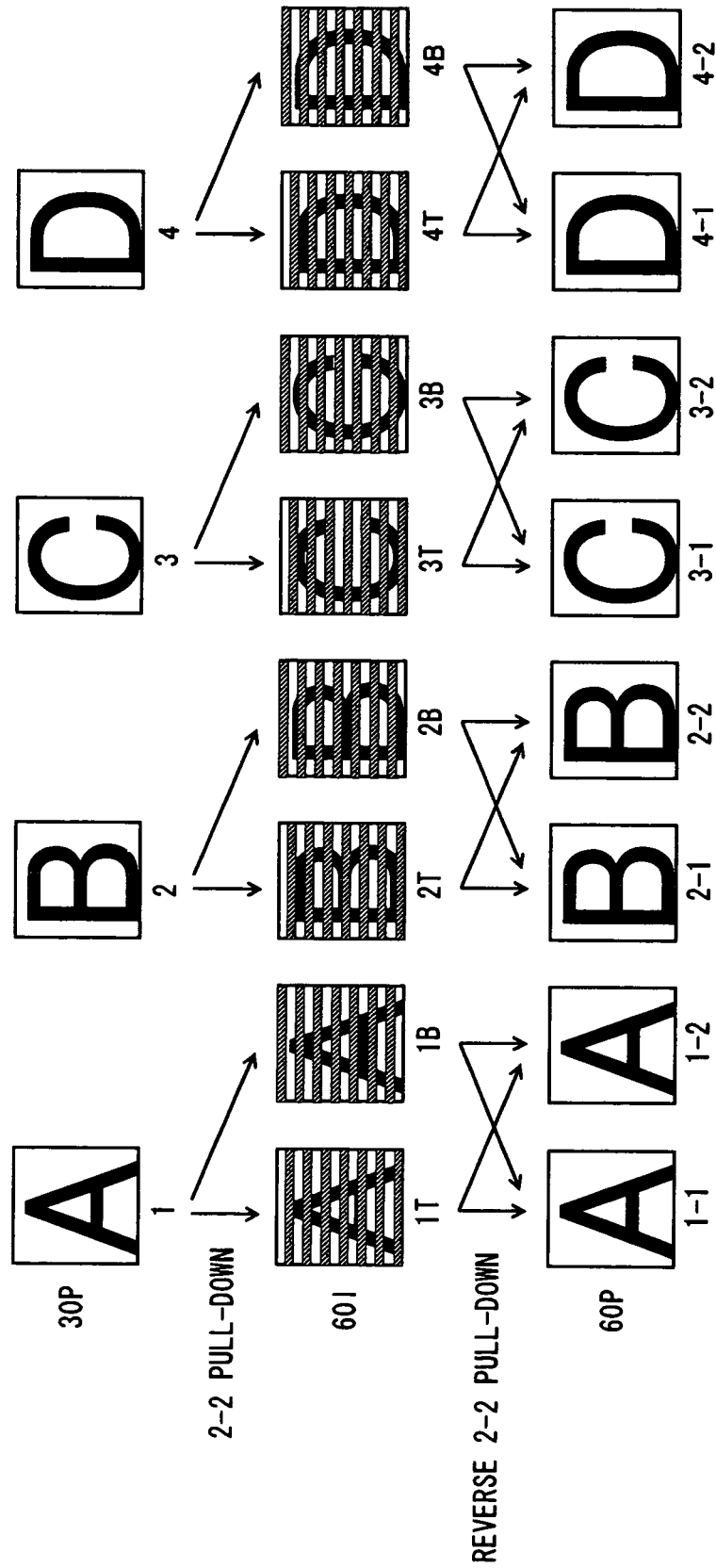
FIG. 19 is a view to describe reverse pull-down processing.

A conventional pull-down detecting apparatus such as the 2-2 pull-down detection apparatus 90 shown in FIG. 18A detects a change in images by comparing the pixels corresponding to vt_tap and v_tap. On the other hand, the 2-2 pull-down detecting apparatus 10 of this embodiment further performs the horizontal comparison and determination with use of h_tap1, h_tap2 and h_tap3 and the temporal comparison and determination with use of t_tap in addition to the comparison and determination with use of vt_tap and v_tap.

If a change in pixel value is large in the horizontal direction, it means that a display image includes high-frequency portion (hereinafter referred to as the edge portion) such as an oblique line and an object boundary. In such an edge portion, it is possible that an edge portion exists in the vertical direction as well. In this case, since a difference in pixel value occurs due to the presence of the edge portion, the determination on vt_tap in a conventional pull-down detecting apparatus is likely to wrongly determines that a image change occurs in spite that no image change occurs between the present field and the subsequent field.

Since the 2-2 pull-down detecting apparatus 10 of this embodiment performs the comparison and determination in the horizontal direction by using h_tap, it is possible to exclude the pixel whose pixel value largely changes in the horizontal direction from the pixels under determination. It is thereby possible to avoid wrong determination due to the presence of the edge portion and improve the determination accuracy of image change.

Further, the 2-2 pull-down detecting apparatus 10 of this embodiment performs the determination in the temporal direction by using t_tap. The advantage of implementing the determination with use of t_tap is as follows.

In a pixel where a change in pixel value is excessively large between the subsequent field a and the present field b, which is, where a temporal change is large, when the determination using vt_tap detects a change in pixel value, it is unable to determine if the change is due to a change in image between fields or due to the edge portion of a high-frequency image. If such a pixel is added to the determination of an image change, the wrong determination of image change is likely to occur even when the subsequent field a and the present field b are created from the same frame.

Since the 2-2 pull-down detecting apparatus 10 of this embodiment performs the temporal comparison and determination by using t_tap, it is possible to exclude the pixel whose pixel value largely changes in the temporal direction from the pixels under determination. It is thereby possible to avoid wrong determination on an image with a large temporal change and improve the determination accuracy of image change.

Meanwhile, if a change in pixel value is small between the subsequent field a and the previous field c, that is when a temporal image change is small, it is assumed that a change in pixel values between the subsequent field a and the present field b is also small. If such a pixel is added to the determination of an image change, it is difficult for the field comparator 13 to determine if images are similar even when the subsequent field a and the present field b are created from different frames.

To overcome the above drawback, the 2-2 pull-down detecting apparatus 10 of this embodiment can exclude the pixel where a temporal image change is small from the determination of similarity between images. It is thereby possible to improve the accuracy that the field comparator 13 determines if images are similar or not. Further, this exclusion can avoid that the determination by using vt_tap determines that an image change exists in spite that an image change is small due to vertically high-frequency image and thus improves the accuracy of determining if images are similar.

Figure 6:
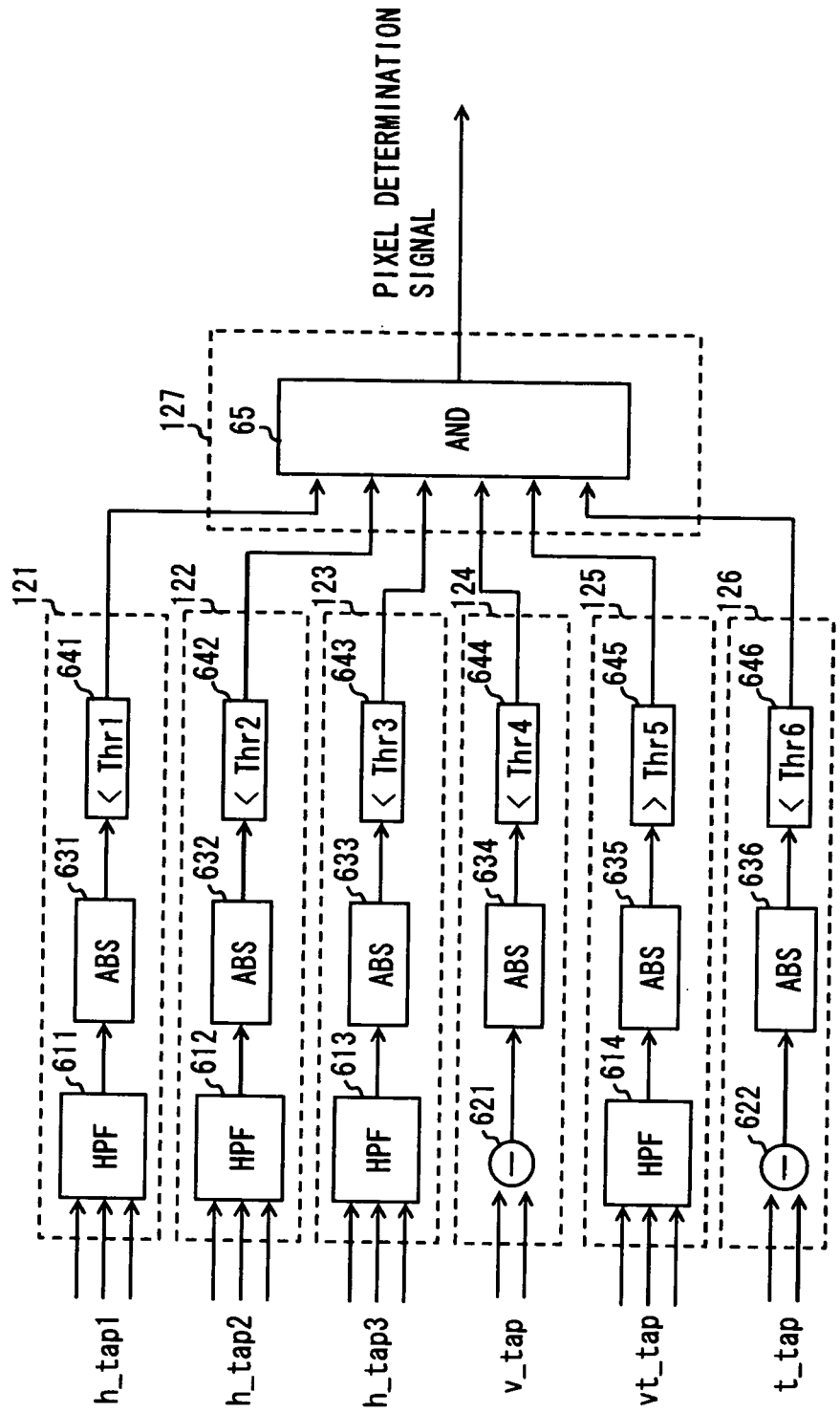
FIG. 6 is a block diagram showing the configuration example of a pixel comparator.

FIG. 6 shows the configuration example of the pixel comparator 12. HPF 611 to 614 are filters that implements calculation of (−1, 2, −1)/2 on three input signals. Subtractors 621 and 622 outputs a difference between two input signals. ABS 631 to 636 outputs an absolute value of an input signal. Threshold comparators 641 to 646 performs threshold determination on the signals supplied from the ABS 631 to 636, respectively, and outputs "1" if the determination result is true and "0" if the determination result is false.

The threshold comparator 641 that performs the threshold determination on h_tap1 outputs "1" if h_tap1 has a small change in pixel value in the horizontal direction and an input signal to the threshold comparator 641 is less than a threshold Thr1. On the contrary, the threshold comparator 641 outputs "0" if h_tap1 has a large change in pixel value in the horizontal direction and an input signal to the threshold comparator 641 is larger than the threshold Thr1. The operation of the threshold comparators 642 and 643 on h_tap2 and h_tap3, respectively, are the same as above. These determination operations allow eliminating a pixel where a change in pixel value in the horizontal direction is large from determination targets.

The threshold comparator 644 outputs "1" if v_tap has a small change in pixel in the vertical direction and an input signal to the threshold comparator 644 is less than a threshold Thr4 and outputs "0" if v_tap has a large change in pixel in the vertical direction and an input signal to the threshold comparator 644 is larger than the threshold Thr4.

The threshold comparator 645 outputs "1" if a difference between the pixel value of the pixel a22 of the subsequent field signal a and the pixel value of the pixel b12 and b32 of the present field signal b is large and an input signal to the threshold comparator 645 is larger than a threshold Thr5. On the contrary, it outputs "0" if a difference between the pixel value of the pixel a22 and the pixel value of the pixels b12 and b32 b is small and an input signal to the threshold comparator 645 is smaller than the threshold Thr5.

The threshold comparator 646 outputs "1" if t_tap has a small change in pixel in the temporal direction and an input signal to the threshold comparator 646 is less than a threshold Thr6 and outputs "0" if t_tap has a large change in pixel in the temporal direction and an input signal to the threshold comparator 646 is larger than the threshold Thr6. These determination operations allow eliminating a pixel where a temporal image change is large from the determination of an image change.

In FIG. 6, the image change detector 127 is composed of an AND circuit 65 that calculates a logical AND of binary signals output from the threshold comparators 641 to 646. The AND circuit 65 outputs "1" as a pixel determination signal when the determination results in the threshold comparators 641 to 646 are all true.

Though FIG. 6 shows the configuration example that sets a threshold value so that the threshold comparator 646 excludes a pixel where t_tap has an excessively large change in pixel in the temporal direction from the determination, the present invention is not limited thereto. In order to exclude the pixel where a temporal image change is small from determination of image change, the threshold comparator 646 may outputs "1" when an input signal to the threshold comparator 646 is equal to or larger than a threshold Thr6. Further, in order to exclude both of the pixel where a temporal change is excessively large and the pixel where a temporal image change is small from determination of image change, the threshold comparator 646 may have two threshold values.

[Field Comparator 13]

The field comparator 13 compiles the determination results in the pixel comparator 12 in units of fields and determines a change in the present field b and the subsequent field a based on the compiling result in each field. The field comparator 13 includes a plurality of counters and divides a screen into a plurality of regions and compiles the determination results in the pixel comparator 12 for each divided region.

A counter section 132 includes a plurality of counters. Each counter is allocated to each divided region of a screen. An area selector 131 receives a pixel determination signal output from the image comparator 12 and selects and outputs a counter in the counter section 132 based on a pixel coordinate. It is thereby possible to integrate the determination results in the pixel comparator 12 for each divided region.

The field change determiner 133 determines if the images are similar between the present field b and the subsequent field a based on the integration results of each divided region in the counter section 132. Specifically, it selects a divided region that is used for the determination of an image change between the fields, determines an image change of the selected divided region and, if an integration value that integrates the results in units of pixels exceeds a predetermined threshold value, determines that the images are not similar. Alternatively, it is feasible to determine if an integration value of a pixel change exceeds the threshold value for each divided region and, if an integration value of a pixel change exceeds a predetermined threshold value in any of region, determines that the images are not similar.

The conventional pull-down detection apparatus such as the 2-2 pull-down detection apparatus 90 shown in FIG. 18A determines if an image change exists by integrating the determination results of a pixel change in one entire screen. However, the integration of the determination results of a pixel change in one entire screen has the problem that the integration values are averaged in the entire screen.

For example, if an image has a moving portion only in a small part of the screen, the conventional pull-down detection apparatus can wrongly determine that there is no image change since it determines if an image change exists based on the integration result of the entire screen and therefore the integration values are averaged in the entire screen. On the other hand, the 2-2 pull-down detection apparatus 10 of this embodiment determines if an integration value of a pixel change exceeds a threshold value for each divided region and detects an image change when an integration value in any of divided regions exceeds a threshold value. It is thereby possible to avoid the wrong determination caused by that there is no change in a main region of an image.

In a region in the image containing high-frequency component, the pixel comparator 12 is likely to wrongly determine an image change due to the presence of an edge portion. Thus, if the region containing the high-frequency component exists in the main area of the image, the conventional pull-down detection apparatus determines if an image change exists between the fields based on the integration value of the entire field that includes lots of wrong determination. Therefore, the conventional pull-down detection apparatus wrongly determines that there is an image change in spite of no image change. On the other hand, the 2-2 pull-down detection apparatus 10 of this embodiment excludes the counter of the counter section 132 having a large integration value from the determination on image change and compares the integration values of the other counters with a predetermined threshold values so as to implement determination on image change by eliminating a region containing wrong determination due to the presence of an edge portion. It is thereby possible to avoid that the wrong determination in the pixel comparator 12 due to the presence of an edge portion affects the determination on image change between fields.

It is preferred to perform the selecting operation of the counter section 132 in the field comparator 13 in coordination with the determination in the horizontal direction using h_tap and the determination in the temporal direction using t_tap in the pixel comparator 12. For example, if the pixel comparator 12 is configured so as to exclude the pixel where a change in pixel value is large in the temporal direction from the determination target by the determination on t_tap as the configuration example in FIG. 6, the field comparator 13 is preferably configured so as to exclude the counter of the counter section 132 which has a large integration value from the determination on image change. This configuration can determine if a change exists between the present field b and the subsequent field a based on the integration result in the region where a pixel change in the temporal direction is not very large, which is the region where wrong determination in the pixel comparator 12 is not likely to occur. It is thereby possible to improve the accuracy of determining a field change in the field comparator 13.

Figure 7:
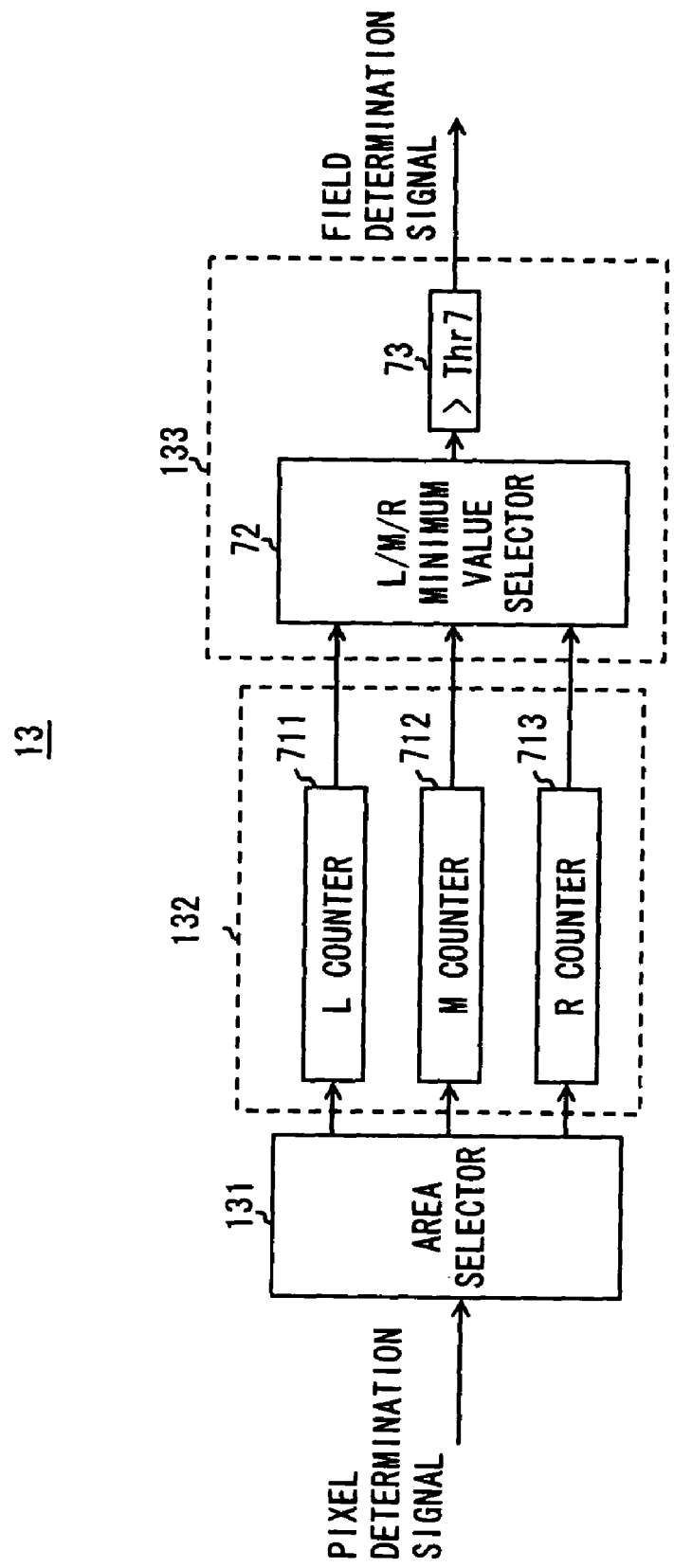
FIG. 7 is a block diagram showing the configuration example of a field comparator.

FIG. 7 shows the configuration example of the field comparator 13. FIG. 7 illustrates the case of horizontally dividing an image region into three regions. The counter section 132 includes an L counter 711 that compiles the determination results of the pixel comparator 12 on the pixels in the left-side region of an image, an M counter 712 that compiles the determination results in the middle region of an image, and an R counter 713 that compiles the determination results in the right-side region of an image.

FIG. 7 shows the case where the field change determinater 133 excludes the region where the integration value in the counter section 132 is large and detects a change in image based on the integration values in the other regions. An L/M/R minimum value selector 72 selects a minimum value from the integration values of the L counter 711, the M counter 712 and the R counter 713. A threshold comparator 73 compares the minimum value selected by the L/M/R minimum value selector 72 with a predetermined threshold Thr7. If the comparison with the threshold Thr7 results in satisfying the relationship of the minimum value>Thr7, it determines that the images are not similar and outputs "1" to the pull-down determinater 14. On the other hand, it the comparison results in satisfying the relationship of the minimum value<Thr7, it determines that the images are similar and outputs "0" to the pull-down determinater 14. The field determination signal is a 1-bit signal that is supplied to the pull-down determinater 14.

FIG. 7 shows the configuration that excludes the region where the integration value in the counter section 132 is large. To exclude the region where the integration value in the counter section 132 is small, the field change determinater 133 may select the counter having a large integration value.

Further, to determine if the integration value in pixel change exceeds a threshold value for each divided region, the L/M/R minimum value selector 72 may be excluded and the threshold comparator 73 may perform the threshold comparison on all the counters.

[Pull-Down Determinater 14]

The pull-down determinater 14 receives the field determination signal that is supplied from the field comparator 13 and determines if it has the regularity of the 2-2 pull-down signal. Specifically, if the input field determination signal has a pattern that 1 and 0 are repeated alternately like "1010 . . . " or "0101 . . . " in each field, the pull-down determinater 14 determines that there is the regularity of 2-2 pull-down signal. If, on the other hand, that repeated pattern of the field determination signal is lost, the pull-down determinater 14 determines that no regularity of 2-2 pull-down signal exists.

Further, if the pull-down determinater 14 detects the regularity of the pull-down signal, it supplies the pull-down detection signal to the output selector 5 and further supplies the field signal to the field selector 3 by determining if the present field signal b that is presently under processing is similar to the subsequent field signal a or the previous field signal c. The field selection signal indicates the subsequent field signal a or the previous field signal c as a field to create an interpolation line. Specifically, if the determination result of the immediately previous field determination signal is "1", the present field signal b and the subsequent field signal a are generated from the same frame, and since the determination result of the presently processed field signal is assumed to be "0" from the regularity of the pull-down signal, the field selection signal is set to indicate the subsequent field signal a. On the contrary, if the determination result of the immediately previous field determination signal is "0", the present field signal b and the subsequent field signal a are generated from difference frames, and since the determination result of the presently processed field signal is assumed to be "1" from the regularity of the pull-down signal, the field selection signal is set to indicate the previous field signal c.

On the other hand, if the pull-down determinater 14 does not detect the regularity of the pull-down signal, or the pull-down regularity is broken, it releases the output of the pull-down detection signal to the output selector 5.

Further, the pull-down determinater 14 determines whether to change the threshold values of the pixel comparator 12 and the field comparator 13 based on the history of the determination results of the above pull-down determination. When the condition for threshold change is satisfied, the pull-down determinater 14 changes the threshold values of the pixel comparator 12 and the field comparator 13 or the threshold value of either one of them.

In the conventional pull-down detection apparatus such as the 2-2 pull-down detection apparatus 90 shown in FIG. 18A, the threshold value that is used for determination on image change is fixed. If the threshold value for the determination is fixed, the determination is performed with the same threshold value even when the type of image is different such as a substantially static image and a largely moving image. Thus, if the set threshold value is not suited to the input field signal, it can cause the continuation of the state where the pull-down is not detected in spite of being a pull-down signal and the continuation of the state where the pull-down is detected due to failing to detect that the input field signal is not the pull-down signal. It further causes fluctuation to occur between the pull-down detection and non-detection. The occurrence of these things leads to deterioration of frame image quality after IP conversion.

On the other hand, the 2-2 pull-down detection apparatus 10 of this embodiment prevent that the above problematic state from continuing by setting a threshold value used for the determination on image change dynamically.

Figure 8:
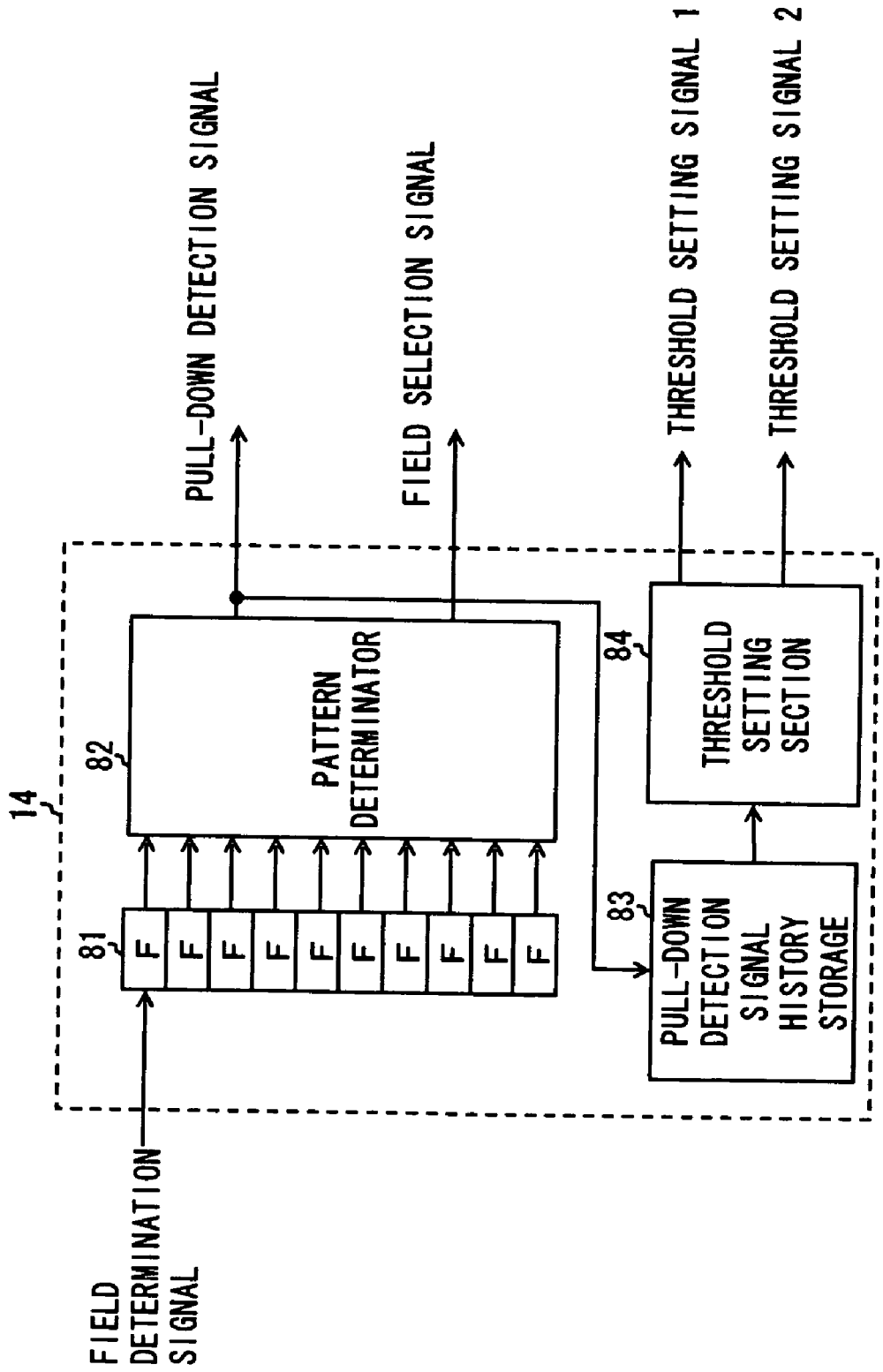
FIG. 8 is a block diagram showing the configuration example of a pull-down determinater.

FIG. 8 shows the configuration example of the pull-down determinater 14. A shift register 81 receives a field determination signal supplied from the field comparator 13 and accumulate the signal by performing shift operation once in each field, thereby retaining the history of the field determination. Though FIG. 8 shows the example where the number of stages of the shift register 81 is 10, it is not limited to this number. Since the fluctuation between the pull-down detection and non-detection is likely to occur if the number of stages of the shift register 81 is small, the detection accuracy increases as the number of stages is larger. However, since a larger number of fields are required until detecting the pull-down if the number of stages of the shift register 81 is larger, a delay time until entering the pull-down detecting state is longer. The actual number of stages are determined as a trade-off of these conflicting factors, and it is generally 4 stages to 10 stages.

The pattern determinater 82 acquires the stored value in the shift register 81 and determines if it matches with a pull-down pattern of "1010 . . . " or "0101 . . . ". If it matches with the pull-down pattern, the pattern determinater 82 supplies a pull-down detection signal to the output selector 5 and also supplies a field selection signal to the field selector 3. If it does not match with the pull-down pattern, the pattern determinater 82 releases the output of pull-down detection signal to the output selector 5.

The pull-down detection signal history storage 83 stores the history of the pull-down detection signal. The threshold setting section 84 determines whether to change the threshold values used for the threshold comparators 641 to 646 in the pixel comparator 12 and the threshold comparator 73 in the field comparator 13 and, if it determines to change the thresholds, outputs a threshold setting signal 1 and a threshold setting signal 2. It is preferred to implement the change of the threshold values in the case where (1) the state where pull-down is not detected continues for a long time, (2) the state where pull-down is detected continues for a long time, and (3) the state varies frequently between the pull-down detection and the pull-down non-detection.

(1) If the state where pull-down is not detected continues for a long time, the threshold value is changed gradually so as to make the pull-down detection easier. If the history of the pull-down detection signal keeps indicating "0" and image matching state continues, the threshold value is changed so as to facilitate detection of image change. For example, it is feasible to make changes such as gradually reducing the threshold Thr7 of the threshold comparator 72, gradually increasing the thresholds Thr1 to 3 of the threshold comparators 641 to 643, respectively, and so on. On the contrary, if the history of the pull-down detection signal keeps indicating "1" and the image changing state continues, it is feasible to change the threshold value so as to make a change to make the detection of image change harder.

If the input signal is a pull-down signal, this is detected and the IP conversion is implemented by using the interpolation signal output from the field selector 3, thereby producing a frame image without image quality deterioration. The 2-2 pull-down detecting apparatus 10 of this embodiment changes the threshold value so as to make the pull-down detection easier, thus improving the detection accuracy of the pull-down state.

(2) If the state where pull-down is detected continues for a long time, the threshold value is changed gradually so as to make the pull-down detection more difficult. For example, it is feasible to make a change of reducing the threshold Thr7 of the threshold comparator 72 gradually. Wrong detection of the image that is not the pull-down signal as the pull-down signal causes serious deterioration of image quality such as comb noise in the frame image output from the up-scan converter 6. The 2-2 pull-down detecting apparatus 10 of this embodiment prevents such serious image quality deterioration by making it easy to break away from the pull-down state.

(3) If the state varies frequently between the pull-down detection and the pull-down non-detection, the threshold value is changed temporarily to the value for not detecting the pull-down. If the state varies frequently between the pull-down detection and the pull-down non-detection, the frame image output from the up-scan converter 6 varies between the frame image after the IP conversion using the interpolation signal output from the field selector 3 and the frame image after the IP conversion using the interpolation signal generated by the progressive filter 4. Since these two frame images have different resolution, frequent switching causes deterioration of image quality such as flicker of the display image. The 2-2 pull-down detecting apparatus 10 of this embodiment prevents the image quality deterioration due to frequency variation of the state between the pull-down detection and the pull-down non-detection by changing the threshold values.

Figure 9:
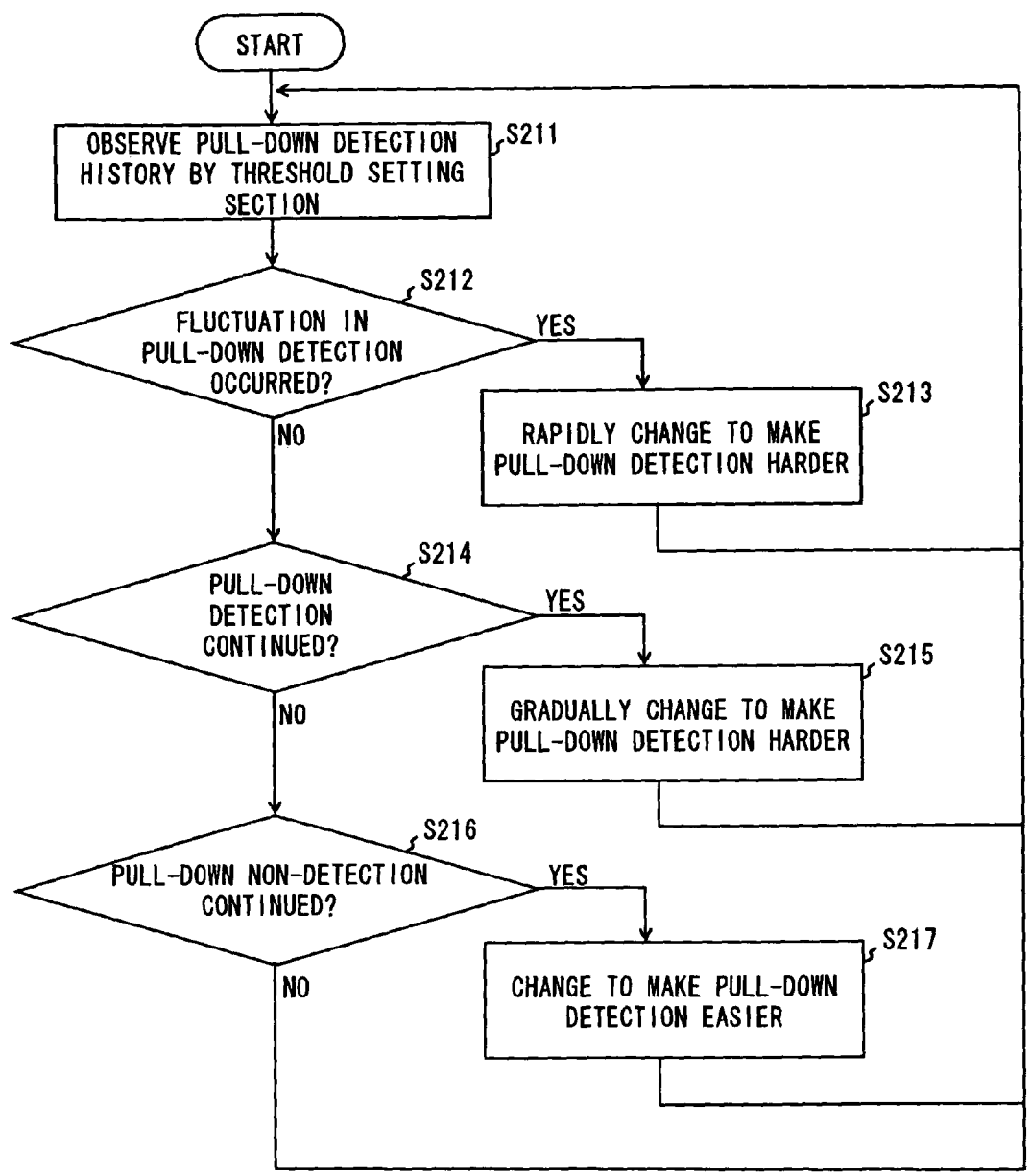
FIG. 9 is a flowchart of a threshold change operation in the pull-down determinater.

The threshold setting operation in the threshold setting section 84 is described hereinafter with reference to the flowchart of FIG. 9. Firstly, in Step S211, the threshold setting section 84 observes the history of the pull-down detection signal. If the frequency variation of the state between the pull-down detection and the pull-down non-detection is detected in Step S212, the threshold value is changed rapidly to the value where the pull-down detection is difficult in Step S213. Then, if the continuation of the pull-down detection state is detected in Step S214, the threshold value is changed gradually so as to make the pull-down detection more difficult in Step S215. If the continuation of the no pull-down detection state is detected in Step S216, the threshold value is changed so as to make the pull-down detection easier in Step S217.

Figure 10:
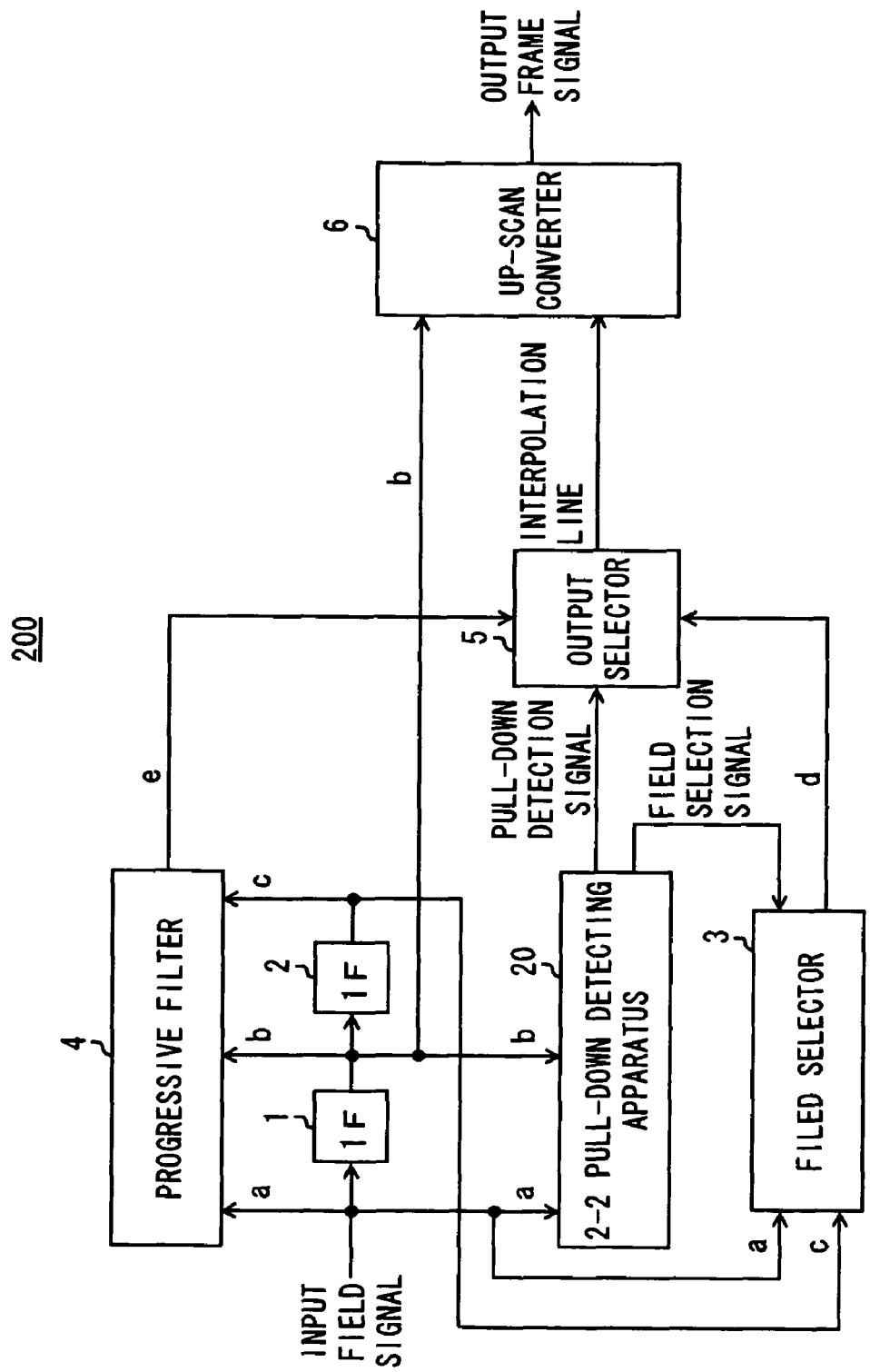
FIG. 10 is a block diagram of a progressive conversion apparatus according to an embodiment of the invention.

The pixel comparator 12 of this embodiment performs the horizontal pixel comparison using h_tap1, h_tap2 and h_tap3 and the temporal pixel comparison using t_tap in addition to the vertical pixel comparison using v_tap and the vertical and temporal pixel comparison using vt_tap. However, it is feasible to select some of these pixel comparisons. For example, it is feasible to perform the comparison of h_tap1, h_tap2 and h_tap3 in addition to v_tap and vt_tap, the comparison of t_tap in addition to v_tap and vt_tap, and the comparison of h_tap2 and t_tap in addition to v_tap and vt_tap Second Embodiment FIG. 10 shows the configuration of a progressive conversion apparatus 200 that includes a 2-2 pull-down detection apparatus 20 according to a second embodiment of the invention. The 2-2 pull-down detection apparatus 20 determines if the input signal is a pull-down signal by using the comparison pixels v_tap, vt_tap, h_tap1, h_tap2 and h_tap3 shown in FIG. 3. The 2-2 pull-down detection apparatus 20 of this embodiment is different from the 2-2 pull-down detection apparatus 10 of the first embodiment in that it does not perform the temporal pixel comparison using t_tap. If the input field signal is a pull-down signal, the 2-2 pull-down detection apparatus 20 supplies a field selection signal to the field selector 3 so as to specify the field to be used for interpolation of a missing line, just like the 2-2 pull-down detection apparatus 10. The field selection signal informs if the field created by the 2-2 pull-down processing from the same field as the present field signal b is the subsequent field signal a or the previous field signal c. Further, the 2-2 pull-down detection apparatus 20 supplies a pull-down detection signal to the output selector 5 so as to change the way of interpolating a missing line depending on if the input field signal is a 2-2 pull-down signal or not.

In the progressive conversion apparatus 200, the components different from the 2-2 pull-down detection apparatus 20 have the same functions as the components of the progressive conversion apparatus 100 of the above-described first embodiment. They are thus denoted by the same reference numerals and the detailed description is omitted.

Figure 11:
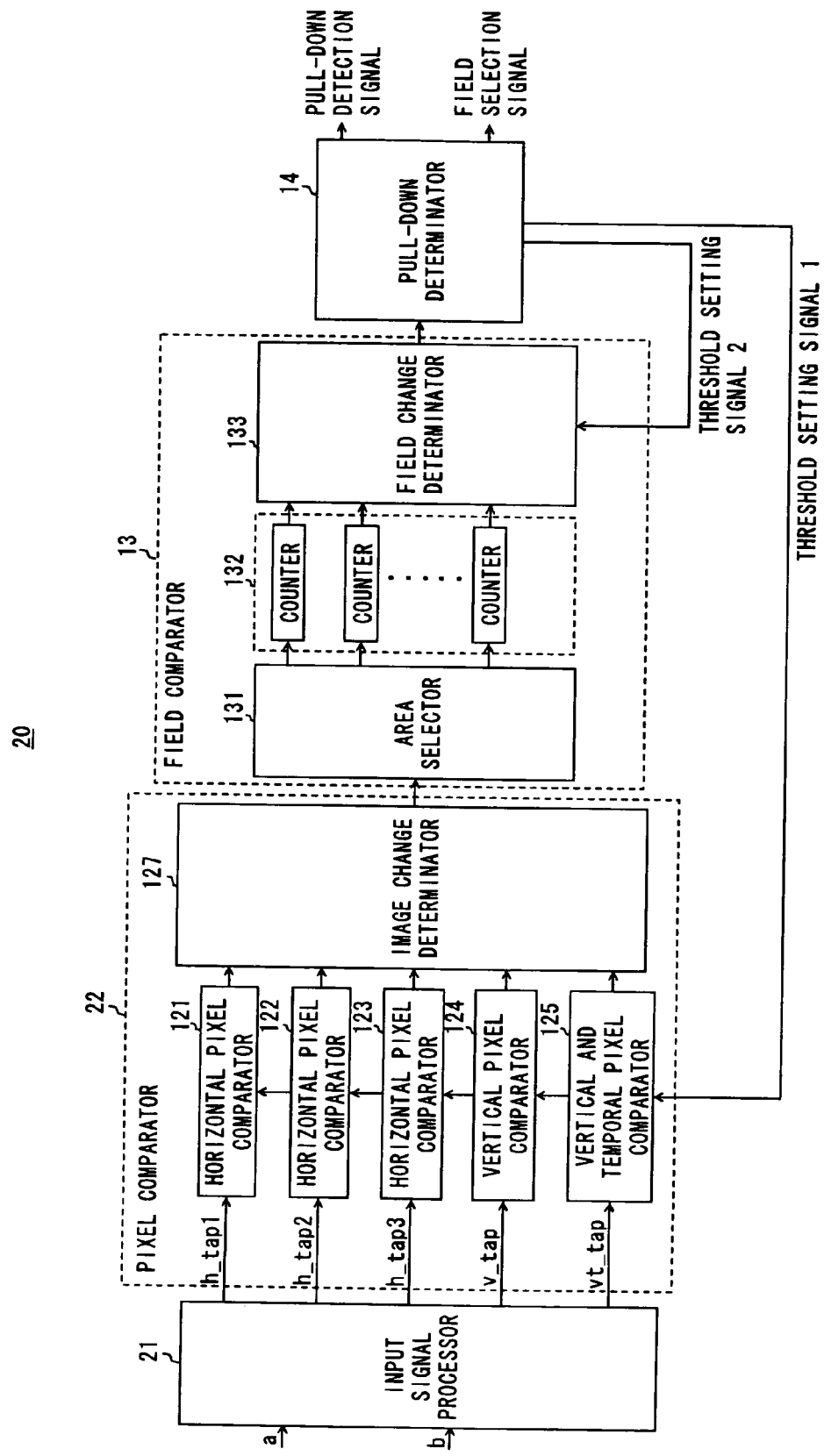
FIG. 11 is a block diagram of a 2-2 pull-down detection apparatus according to an embodiment of the invention.
Figure 12:
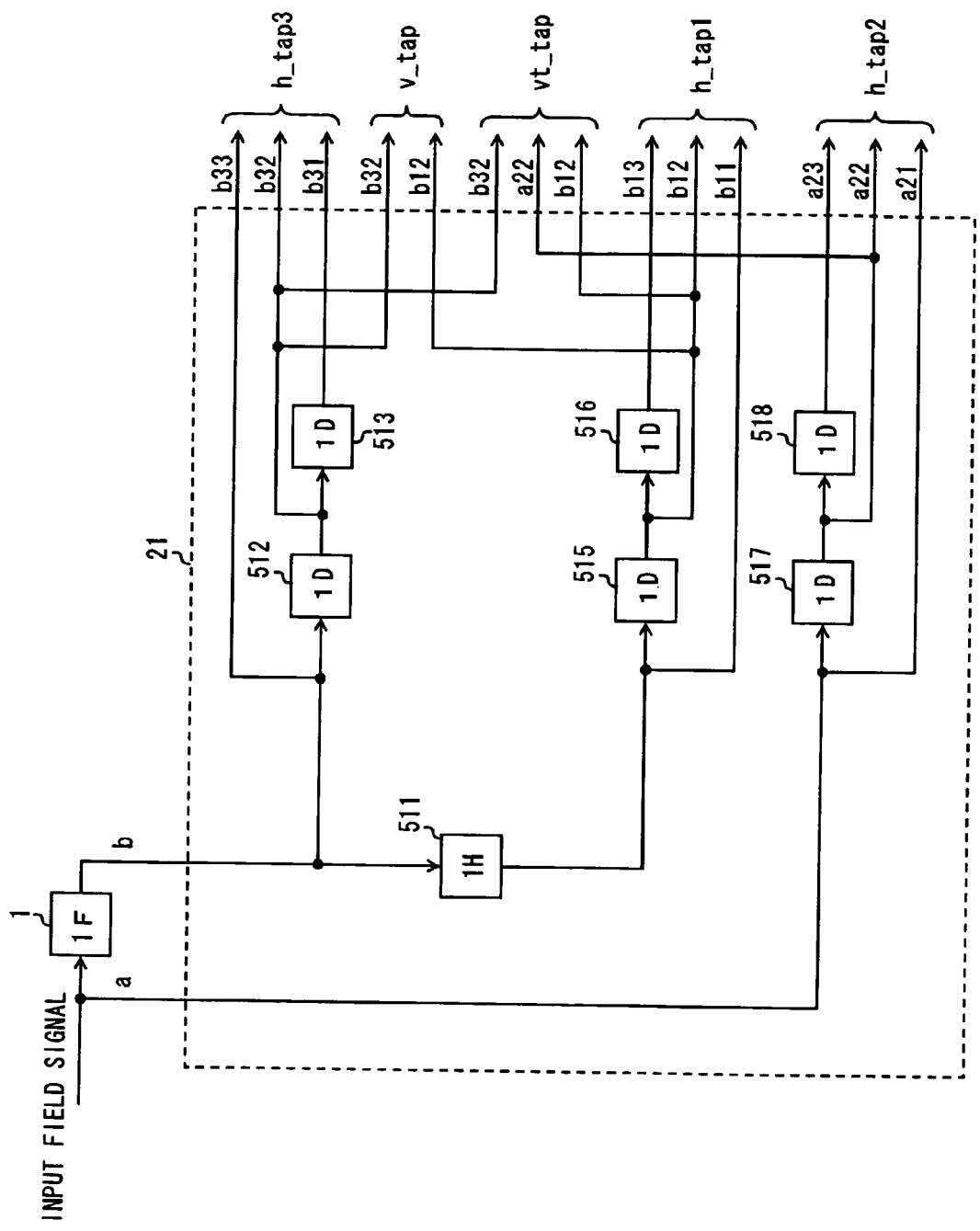
FIG. 12 is a block diagram showing the configuration example of an input signal processor.

FIG. 11 shows the configuration of the 2-2 pull-down detection apparatus 20. The input signal processor 21 receives two successive field signals a and b and outputs a signal used in the pixel comparator 22. Specifically, it supplies to the pixel comparator 22 the signals h_tap1, h_tap2 and h_tap3 that are used for the detection of a change in pixel value in the horizontal direction, v_tap that is used for the detection of a change in pixel value in the vertical direction, and vt_tap that is used for the detection of a change in pixel value in the vertical and temporal direction FIG. 12 shows the specific configuration example of the input signal processor 21. Like the pixel comparator 11 of the 2-2 pull-down detection apparatus 10 of the first embodiment, it is possible to produce h_tap1, h_tap2, h_tap3, v_tap and vt_tap by combination of the line delay circuit 511, the dot delay circuits 512, 513, 515 to 518.

The pixel comparator 22 determines if the images are similar between the present field b and the subsequent field a in units of pixels by using h_tap1, h_tap2, h_tap3, v_tap and vt_tap that are supplied from the input signal processor 21.

The functions and operation of the horizontal pixel comparators 121 to 123, the vertical pixel comparator 124 and the vertical and temporal pixel comparator 125 are the same as those of the pixel comparator 12 in the 2-2 pull-down detection apparatus 10. Specifically, the horizontal pixel comparators 121 to 123 detect the presence or absence of a change in image in the horizontal direction by using h_tap1, h_tap2 and h_tap3. The vertical pixel comparator 124 detects a change in image in the present field b in the vertical direction by using v_tap. The vertical and temporal pixel comparator 125 detects a change in image between the present field b and the subsequent field a by using vt_tap.

The pixel change determiner 127 determines if images are similar between the present field b and the subsequent field a, when focusing on the pixel a21 of the subsequent field a, based on the detection results in the horizontal pixel comparator 121 to 123, the vertical pixel comparator 124 and the vertical and temporal pixel comparator 125.

Figure 13:
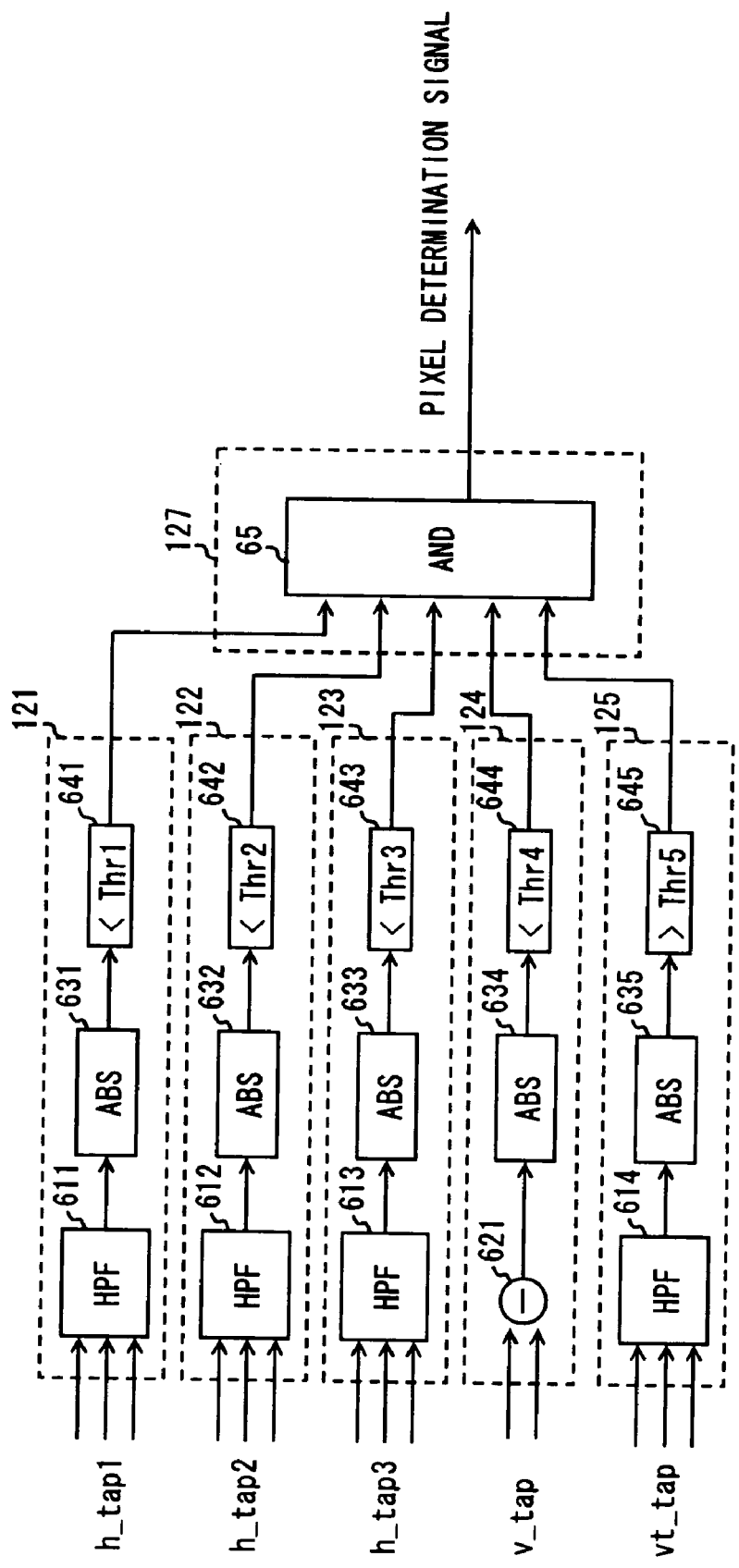
FIG. 13 is a block diagram showing the configuration example of a pixel comparator.

FIG. 13 shows the configuration example of the pixel comparator 22. The HPF 611 to 614, the subtracter 621, ABS 631 to 635 and the threshold comparators 641 to 645 are the same as those in the pixel comparator shown in FIG. 6. In FIG. 13, the pixel change determiner 127 is composed of the AND circuit 65 that calculates a logical AND of binary signals output from the threshold determiner 641 to 646. The AND circuit 65 outputs "1" as a pixel determination signal when the determination results in the threshold determiners 641 to 646 are all true.

The functions and operation of the field comparator 13 and the pull-down determiner 14 in the 2-2 pull-down detection apparatus 20 of FIG. 11 are the same as those in the 2-2 pull-down detection apparatus 10 of the first embodiment. They are thus denoted by the same reference numerals and not detailed herein.

As described above, the 2-2 pull-down detection apparatus 20 of this embodiment performs the comparison and determination in the horizontal direction by using h_tap1 to h_tap 3 in addition to the comparison and determination by using vt_tap and v_tap. Since the 2-2 pull-down detection apparatus 20 of this embodiment performs the horizontal comparison and determination by using h_tap, it can exclude the pixel whose pixel value changes largely in the horizontal direction from the determination target. It is thereby possible to improve the determination accuracy in image change by preventing the wrong determination due to the presence of the edge portion in the display image.

Third Embodiment

Figure 14:
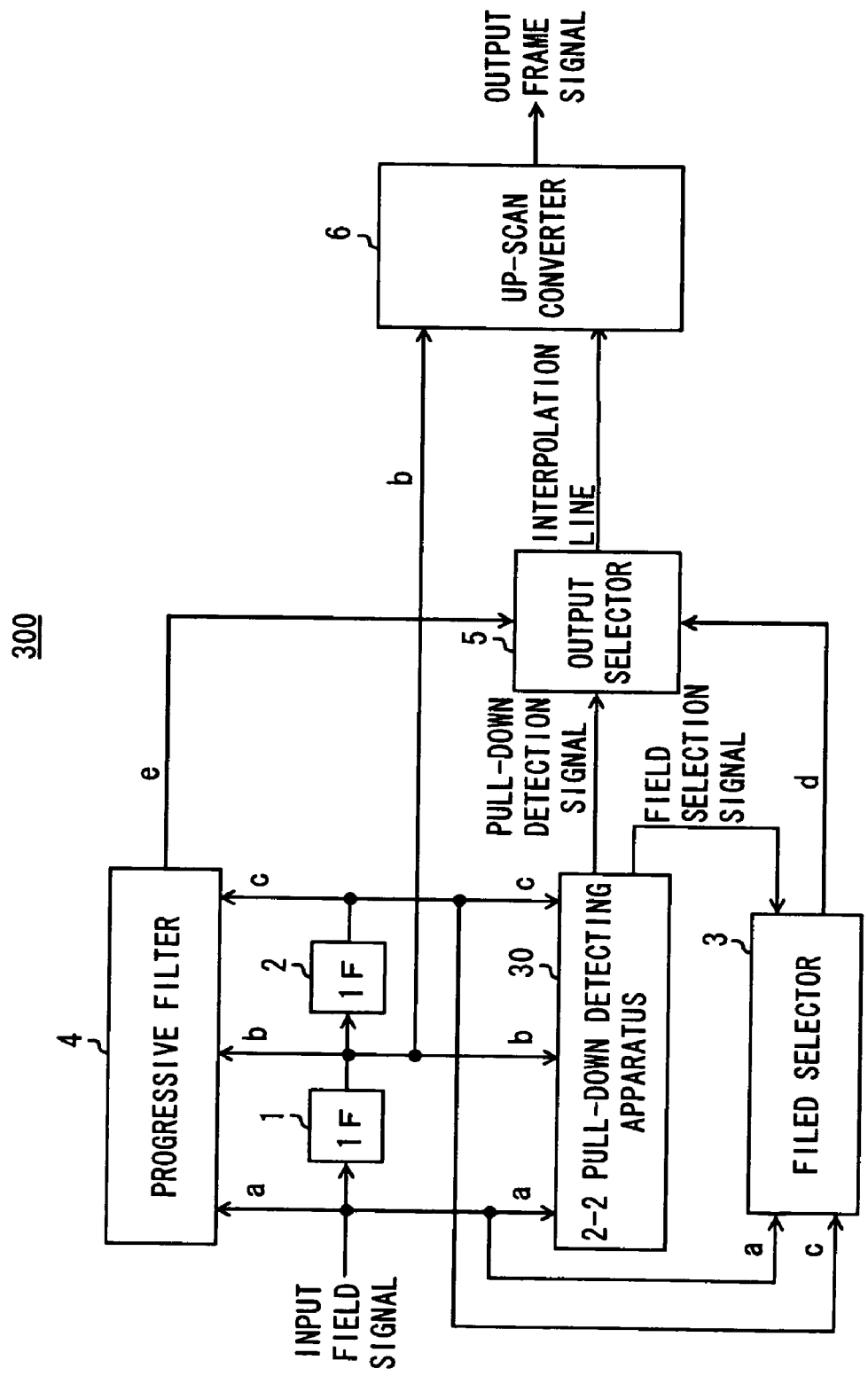
FIG. 14 is a block diagram of a progressive conversion apparatus according to an embodiment of the invention.

FIG. 14 shows the configuration of a progressive conversion apparatus 300 that includes a 2-2 pull-down detection apparatus 30 according to a third embodiment of the invention. The 2-2 pull-down detection apparatus 30 determines if the input signal is a pull-down signal by using the comparison pixels v_tap, vt_tap, and t_tap shown in FIG. 3. The 2-2 pull-down detection apparatus 30 of this embodiment is different from the 2-2 pull-down detection apparatus 10 of the first embodiment in that it does not perform the horizontal pixel comparison using h_tap 1 to 3. If the input field signal is a pull-down signal, the 2-2 pull-down detection apparatus 30 supplies a field selection signal to the field selector 3 so as to specify the field to be used for interpolation of a missing line, just like the 2-2 pull-down detection apparatus 10. The field selection signal informs if the field created by the 2-2 pull-down processing from the same field as the present field signal b is the subsequent field signal a or the previous field signal c. Further, the 2-2 pull-down detection apparatus 30 supplies a pull-down detection signal to the output selector 5 so as to change the way of interpolating a missing line depending on if the input field signal is a 2-2 pull-down signal or not.

In the progressive conversion apparatus 300, the components different from the 2-2 pull-down detection apparatus 30 have the same functions as the components of the progressive conversion apparatus 100 of the above-described first embodiment. They are thus denoted by the same reference numerals and the detailed description is omitted.

Figure 15:
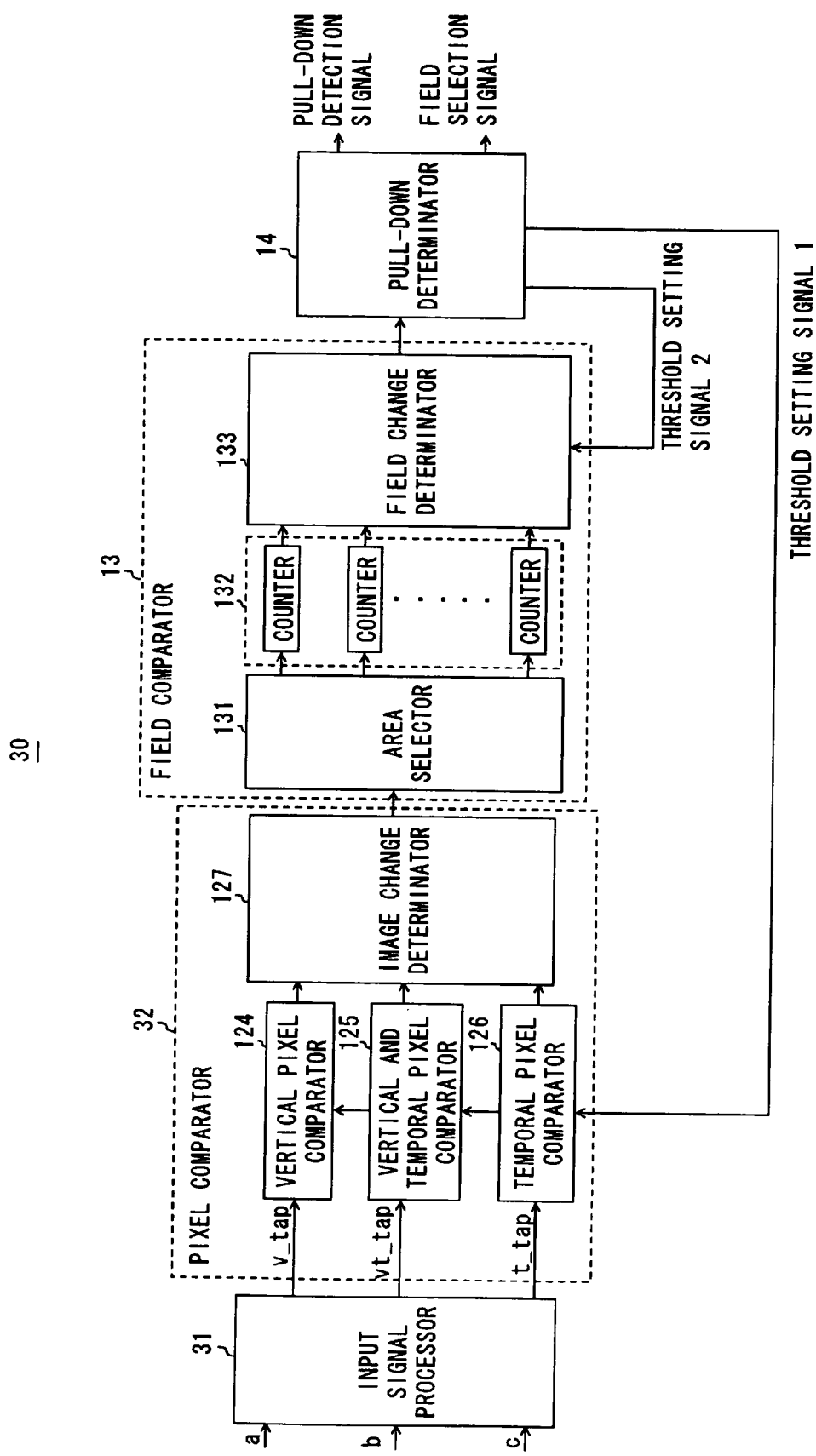
FIG. 15 is a block diagram of a 2-2 pull-down detection apparatus according to an embodiment of the invention.

FIG. 15 shows the configuration of the 2-2 pull-down detection apparatus 30. The input signal processor 31 receives three successive field signals a, b and c and outputs a signal used in the pixel comparator 32. Specifically, it supplies to the pixel comparator 32 the signals v_tap that is used for the detection of a change in pixel value in the vertical direction, vt_tap that is used for the detection of a change in pixel value in the vertical and temporal direction, and t_tap that is used for the detection of a change in pixel value in the temporal direction.

Figure 16:
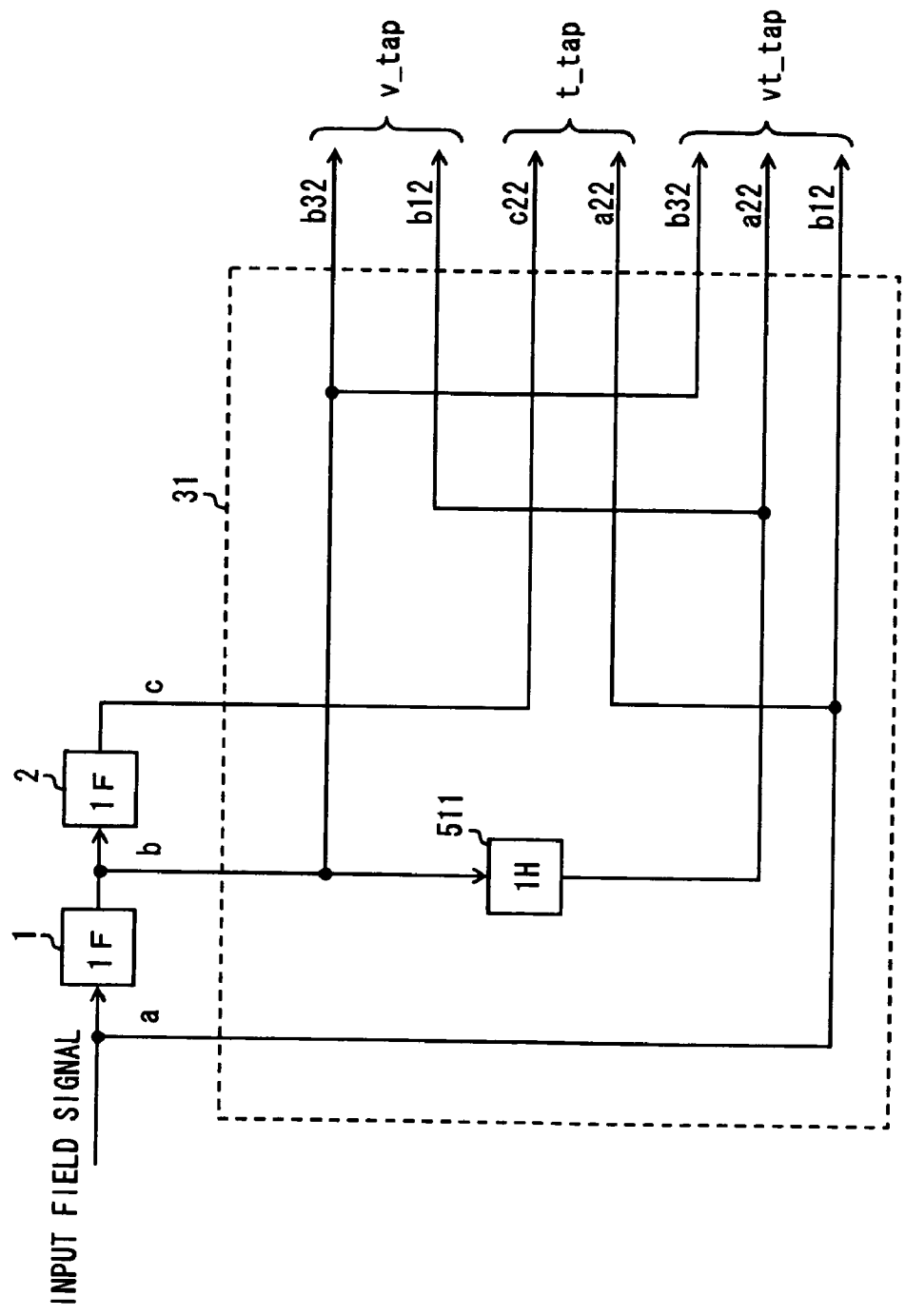
FIG. 16 is a block diagram showing the configuration example of an input signal processor.

FIG. 16 shows the specific configuration example of the input signal comparator 31. Like the pixel comparator 11 of the 2-2 pull-down detection apparatus 10 of the first embodiment, it is possible to produce v_tap, vt_tap and t_tap by delaying the input signal b for one line by the line delay circuit 511.

The pixel comparator 32 determines if the images are similar between the present field b and the subsequent field a in units of pixels by using v_tap, vt_tap and t_tap that are supplied from the input signal processor 31.

The functions and operation of the vertical pixel comparator 124, the vertical and temporal pixel comparator 125 and the temporal pixel comparator 126 are the same as those of the pixel comparator 12 in the 2-2 pull-down detection apparatus 10. Specifically, the vertical pixel comparator 124 detects a change in image in the present field b in the vertical direction by using v_tap. The vertical and temporal pixel comparator 125 detects a change in image between the present field b and the subsequent field a by using vt_tap. The temporal pixel comparator 126 detects a change in image between the present field b and the subsequent field a by using t_tap.

The image pixel determiner 127 determines if images are similar between the present field b and the subsequent field a, when focusing on the pixel a21 of the subsequent field a, based on the detection results in the vertical pixel comparator 124, the vertical and temporal pixel comparator 125 and the temporal pixel comparator 126.

Figure 17:
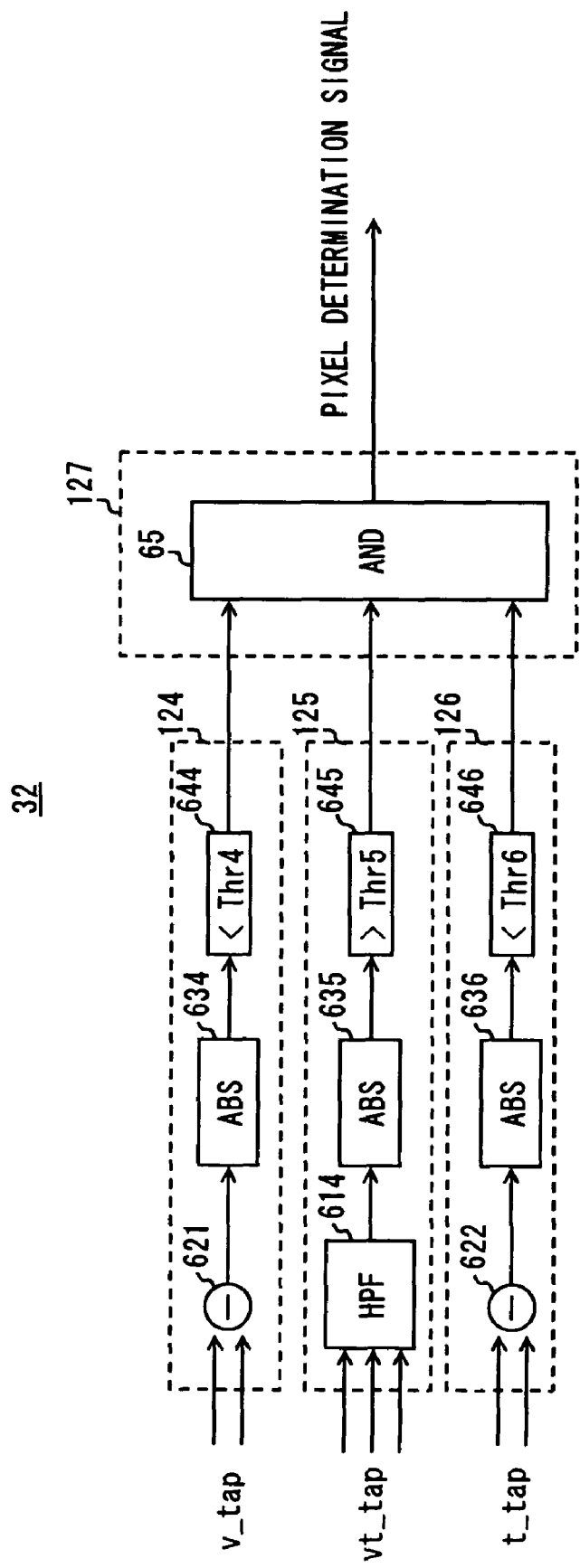
FIG. 17 is a block diagram showing the configuration example of a pixel comparator.

FIG. 17 shows the configuration example of the pixel comparator 32. The HPF 611 to 614, the subtracter 621, ABS 631 to 635 and the threshold comparators 644 to 646 are the same as those in the pixel comparator shown in FIG. 6. In FIG. 17, the pixel change determiner 127 is composed of the AND circuit 65 that calculates a logical AND of binary signals output from the threshold determiner 644 to 646. The AND circuit 65 outputs "1" as a pixel determination signal when the determination results in the threshold determiners 644 to 646 are all true.

The functions and operation of the field comparator 13 and the pull-down determiner 14 in the 2-2 pull-down detection apparatus 30 of FIG. 15 are the same as those in the 2-2 pull-down detection apparatus 10 of the first embodiment. They are thus denoted by the same reference numerals and not detailed herein.

As described above, the 2-2 pull-down detection apparatus 30 of this embodiment performs the comparison and determination in the temporal direction by using t_tap in addition to the comparison and determination by using vt_tap and v_tap. Since the 2-2 pull-down detection apparatus 30 of this embodiment performs the temporal comparison and determination by using t_tap, it can exclude the pixel whose pixel value changes largely between the subsequent field a and the previous field c or where a temporal change is large from the determination target.

Further, in the pixel where a temporal change is large, when the determination using vt_tap detects a change in pixel value, it is unable to determine if it is due to a change in image between fields or due to the edge portion of a high-frequency image. If such a pixel is added to the determination of an image change, the wrong determination of image change is likely to occur even when the subsequent field a and the present field b are created from the same frame.

The 2-2 pull-down detection apparatus 30 performs the temporal comparison and determination by using t_tap to exclude the pixel whose pixel value changes largely in the temporal direction from the determination target. It is thereby possible to prevent wrong determination on the image with a large temporal change and improve the determination accuracy of an image change.

Though FIG. 17 shows the configuration example that sets a threshold value so that the threshold comparator 646 excludes a pixel where a temporal pixel change in t_tap is small from the determination, the present invention is not limited thereto. In order to exclude the pixel where a temporal image change is small from determination of image change, the threshold comparator 646 may output "1" when an input signal to the threshold comparator 646 is equal to or larger than a threshold Thr6. This configuration allows eliminating the pixel with a small temporal image change from the determination on similarity of images. It is thereby possible to prevent that the determination using vt_tap wrongly determines that an image change exists in spite of a small image change due to being a vertically high-frequency image, thereby improving the accuracy for determining if the images are similar.

Further, in order to exclude both of the pixels where a temporal change is excessively large and the pixel where a temporal image change is small from the determination of image change, the threshold comparator 646 may have two threshold values.

The above embodiments describes the case where the present invention is applied to the 2-2 pull-down detection apparatus and the progressive conversion apparatus that detects a 2-2 pull-down signal and implements IP conversion. The present invention is also applicable to a 2-3 pull-down detection apparatus and a progressive conversion apparatus that detects a 2-3 pull-down signal and implements IP conversion in the same way as the apparatus for 2-2 pull-down detection.

It is apparent that the present invention is not limited to the above embodiment that may be modified and changed without departing from the scope and spirit of the invention.

What is claimed is:

1. A pull-down detection apparatus for detecting that an input video signal is generated by a pull-down processing, the pull-down detection apparatus comprising:
   a pixel comparator performing at least a pixel comparison between a first field included in the input video signal and a second field that is one-field before the first field and a pixel comparison between the first field and a third field that is two-fields before the first field to determine a presence of a pixel change between the first field and the second field;
   a field comparator compiling a determination result in the pixel comparator and determining a presence of an image change between the first field and the second field based on the determination result in the pixel comparator; and a pull-down determiner determining that the input video signal is generated by the pull-down processing based on a history of a determination result in the field comparator, wherein the pixel comparator measures a difference in pixel value between a first pixel included in the first field and a third pixel included in the third field and located in the same coordinate as the first pixel and, when the difference is less than a predetermined threshold value, the pixel comparator excludes the first pixel from the determination of a presence of a pixel change.

2. The pull-down detection apparatus according to claim 1, wherein the pixel comparator further compares the first pixel with a second pixel contained in the second field and located adjacently over or under the first pixel.

3. The pull-down detection apparatus according to claim 2, wherein the pixel comparator further compares the first pixel with a pixel located horizontally and adjacently to the first pixel to determine a presence of a pixel change between the first field and the second field.

4. The pull-down detection apparatus according to claim 1, wherein the pull-down determiner changes a condition for determining a presence of a pixel change in the pixel comparator based on a history of determination if the input video signal is generated by pull-down processing.

5. The pull-down detection apparatus according to claim 1, wherein the pull-down determiner changes a condition for determining a presence of a pixel change in the field comparator based on a history of determination if the input video signal is generated by pull-down processing.

6. A pull-down detection method for detecting that a video signal is generated by a pull-down processing, the method comprising:

measuring a difference in pixel between a first field included in the video signal and a second field that is one-field before the first field and comparing the difference with a first threshold value;

measuring a difference in pixel between the first field and a third field that is two-field before the first field and comparing the difference with a second threshold value;

determining a presence of a pixel change between the first field and the second field based on a comparison result between the first threshold value and the second threshold value;

compiling a determination result of a presence of a pixel change for one field and determining a presence of an image change between the first field and the second field based on the compiling result; and determining that the video signal is generated by the pull-down processing based on a history of a determination result of a presence of an image change, wherein the measuring of the difference in pixel between the first field and the third field further comprises measuring a difference in pixel value between a first pixel included in the first field and a third pixel included in the third field and located in the same coordinate as the first pixel, and wherein the comparing of the difference with the second threshold value further comprises when the difference is less than the second threshold value, excluding the first pixel from the determination of a presence of a pixel change.

7. The pull-down detection method according to claim 6, wherein the determination result of a presence of a pixel change is compiled by dividing according to pixel location in the fields and a presence of an image change between the first field and the second field is determined based on the divided and compiled determination result.

8. The pull-down detection method according to claim 6, wherein the first threshold value and/or the second threshold value are changed based on a history of determination if the video signal is generated by pull-down processing.

9. The pull-down detection method according to claim 6, wherein a condition for determining a presence of a image change between the first field and the second field is changed based on a history of determination when the video signal is generated by pull-down processing.

* * * * *